United States Patent
Shigemitsu et al.

(10) Patent No.: US 9,715,077 B2
(45) Date of Patent: Jul. 25, 2017

(54) LENS ALIGNING DEVICE AND IMAGE CAPTURING LENS

(75) Inventors: Norimichi Shigemitsu, Osaka (JP); Hiroyuki Hanato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1449 days.

(21) Appl. No.: 13/435,369

(22) Filed: Mar. 30, 2012

(65) Prior Publication Data

US 2012/0316825 A1 Dec. 13, 2012

(30) Foreign Application Priority Data

Jun. 10, 2011 (JP) .................................. 2011-130610
Mar. 12, 2012 (JP) .................................. 2012-055088

(51) Int. Cl.
*G06F 15/00* (2006.01)
*G02B 7/00* (2006.01)

(52) U.S. Cl.
CPC .................................... *G02B 7/005* (2013.01)

(58) Field of Classification Search
CPC .......... G02B 7/005; G06F 15/00; G01B 11/14
USPC ....................................................... 702/150
See application file for complete search history.

(56) References Cited

U.S. PATENT DOCUMENTS

| 2008/0063838 A1* | 3/2008 | Kurihara | ............. | H01L 23/4985 |
| | | | | 428/141 |
| 2010/0290123 A1 | 11/2010 | Yamada et al. | | |
| 2011/0096221 A1* | 4/2011 | Tsai | ................... | G02B 13/0035 |
| | | | | 348/340 |

FOREIGN PATENT DOCUMENTS

| JP | 2007-52335 A | 3/2007 |
| JP | 2007-65365 A | 3/2007 |
| JP | 2008-158125 | 7/2008 |
| JP | 2010-230745 | 10/2010 |
| JP | 2010-266667 | 11/2010 |
| JP | 2011-13576 | 1/2011 |
| JP | 2011-33473 A | 2/2011 |

OTHER PUBLICATIONS

English Translation of Abe JP-2007-065365.*

* cited by examiner

*Primary Examiner* — Gregory J Toatley
*Assistant Examiner* — Yoshihisa Ishizuka
(74) *Attorney, Agent, or Firm* — Nixon & Vanderhye P.C.

(57) ABSTRACT

A lens aligning device includes: a decentering detection mechanism for measuring a first lens decentering amount; a aligning position calculation control mechanism for calculating a target inter-lens decentering amount by using Formula (1); an adjustment mechanism for moving at least one of a first lens and a second lens so that the inter-lens decentering amount matches the target inter-lens decentering amount.

$$\text{Inter-lens decentering amount} = \text{First lens decentering amount} \times -2 \qquad (1)$$

4 Claims, 23 Drawing Sheets

FIG. 4
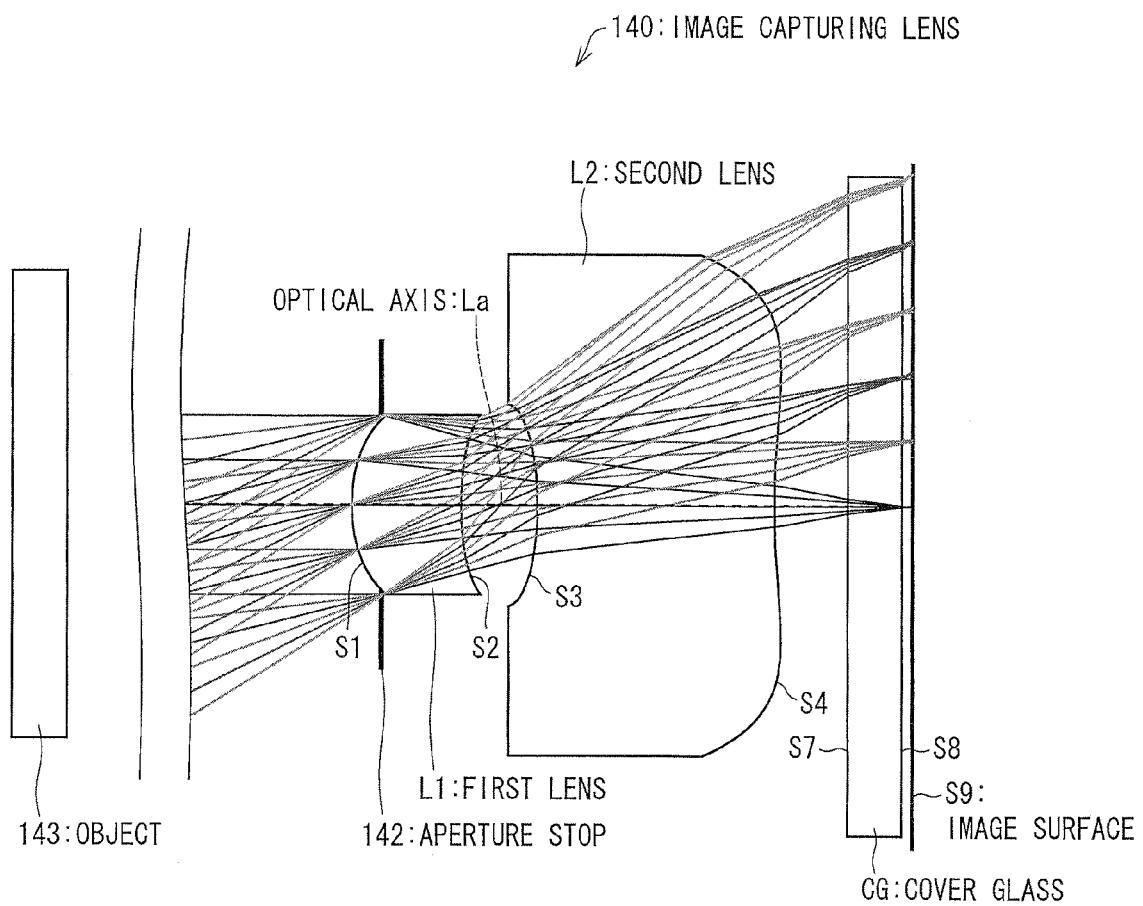
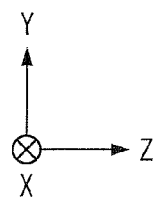

FIG. 8

| STRUCTURE | | MATERIAL | | EFFEC-TIVE RADIUS [mm] | CURVA-TURE [mm⁻¹] | ASPHERICAL SURFACE COEFFICIENT | | | | | | | |
|---|---|---|---|---|---|---|---|---|---|---|---|---|---|
| LENS | SURFACE | Nd | νd | | | Conic | A4 | A6 | A8 | A10 | A12 | A14 | A16 |
| L1 | S1 | 1.498 | 46 | 0.476 | 1.35603 | 0.00000 | 0.00653 | 0.35878 | -0.80311 | -1.70218 | 35.46531 | -183.90435 | 420.83614 |
| | S2 | | | 0.463 | 0.55948 | 0.00000 | 0.53908 | -2.87869 | 28.89572 | -61.19770 | -63.36951 | -15.74612 | 2766.81173 |
| L2 | S3 | 1.498 | 46 | 0.552 | -0.34669 | 0.00000 | -0.40998 | -2.69720 | 13.79388 | -39.87286 | -33.83580 | 338.21799 | -707.39111 |
| | S4 | | | 1.359 | 0.00352 | 0.00000 | 0.22963 | -1.30518 | 2.59979 | -2.91172 | 1.83212 | -0.60674 | 0.08190 |

FIG. 9

| Sensor | Size [mm] | Diagonal | 3.500 |
|---|---|---|---|
| | | Horizontal | 2.800 |
| | | Vertical | 2.100 |
| | Pixel pitch [μm] | | 1.75 |
| F number | | | 2.80 |
| Focal length [mm] | | | 2.663 |
| Field of view [deg] | | Diagonal | 65.0 |
| | | Horizontal | 54.0 |
| | | Vertical | 41.6 |
| TV distortion [%] | | | −0.33 |
| Relative illumination [%] | | h0.6 | 72.4 |
| | | h0.8 | 62.7 |
| | | h1.0 | 44.3 |
| CRA [deg] | | h0.6 | 24.6 |
| | | h0.8 | 26.6 |
| | | h1.0 | 26.4 |
| Optical length [mm] | | | 3.01 |
| CG thickness [mm] | | | 0.300 |
| Hyper focal distance [mm] | | | 1448 |

· Object distance 1200mm
· Design wave weight 404.66nm=0.13, 435.84nm=0.49, 486.1327nm=1.57, 546.07nm=3.12, 587.5618nm=3.18, 656.2725nm=1.51

FIG. 22

| STRUCTURE | | CURVA-TURE [mm⁻¹] | THICK-NESS [mm] | EFFEC-TIVE RADIUS [mm] | Conic | A4 | A6 | A8 | A10 | A12 | A14 | A16 |
|---|---|---|---|---|---|---|---|---|---|---|---|---|
| | | | | | | | | ASPHERICAL SURFACE COEFFICIENT | | | | |
| APERTURE | S0 | 0.00000 | -0.129 | 0.508 | 0.00000 | 0.00000 | 0.00000 | 0.00000 | 0.00000 | 0.00000 | 0.00000 | 0.00000 |
| L1 | S1 | 1.11054 | 0.505 | 0.543 | 0.00000 | 0.00000 | 0.00000 | 0.00000 | 0.00000 | 0.00000 | 0.00000 | 0.00000 |
| | S2 | 0.32356 | 0.476 | 0.553 | 0.00000 | -0.06987 | 0.57836 | -4.61145 | 13.45179 | 0.00000 | 0.00000 | 0.00000 |
| L2 | S3 | -1.16222 | 0.297 | 0.562 | 0.00000 | -0.64755 | 1.98276 | -21.66380 | 117.79104 | -20.47351 | 0.00000 | 0.00000 |
| | S4 | -0.95603 | 0.340 | 0.714 | 0.00000 | -0.55755 | 1.32261 | -2.81860 | 13.02884 | -198.82596 | 0.00000 | 0.00000 |
| L3 | S5 | 0.35852 | 0.616 | 1.163 | 0.00000 | -0.80173 | 0.26701 | 1.54250 | -2.92069 | -12.66870 | 0.00000 | 0.00000 |
| | S6 | 0.67416 | 0.503 | 1.439 | 0.00000 | -0.62492 | 0.46302 | -0.32391 | 0.15278 | 2.33803 | -0.88587 | 0.12846 |
| CG | S7 | 0.00000 | 0.300 | — | 0.00000 | 0.00000 | 0.00000 | 0.00000 | 0.00000 | -0.05393 | 0.01323 | -0.00220 |
| | S8 | 0.00000 | 0.100 | — | 0.00000 | 0.00000 | 0.00000 | 0.00000 | 0.00000 | 0.00000 | 0.00000 | 0.00000 |
| SENSOR | S9 | 0.00000 | 0.000 | 1.792 | 0.00000 | 0.00000 | 0.00000 | 0.00000 | 0.00000 | 0.00000 | 0.00000 | 0.00000 |

FIG. 23

| Lens | construction | | 3P |
|---|---|---|---|
| | L1 | Nd | 1.518 |
| | | νd | 56.5 |
| | L2 | Nd | 1.6052 |
| | | νd | 27.5 |
| | L3 | Nd | 1.518 |
| | | νd | 56.5 |
| Sensor | Pixel size [μm] | | 1.4 |
| | Resolution | H | 2048 |
| | | V | 1536 |
| | Size [mm] | D | 3.584 |
| | | H | 2.867 |
| | | V | 2.150 |
| F number | | | 2.80 |
| Focal length [mm] | | | 2.844 |
| Field of view [deg] | | Diagonal | 65.0 |
| | | Horizontal | 54.0 |
| | | Vertical | 41.7 |
| Optical distortion [%] | | h0.6 | -0.1 |
| | | h0.8 | -0.4 |
| | | h1.0 | -0.4 |
| TV distortion [%] | | | -0.17 |
| Relative illumination [%] | | h0.6 | 76.5 |
| | | h0.8 | 62.7 |
| | | h1.0 | 50.3 |
| CRA [deg] | | h0.6 | 24.1 |
| | | h0.8 | 26.4 |
| | | h1.0 | 25.9 |
| Optical length [mm] | | | 3.012 |
| CG thickness [mm] | | | 0.300 |
| Hyper focal distance [mm] | | | 2063 |

※APPLICABLE WAVELENGTH
 404.66nm=0.13、435.84nm=0.49、486.1327nm=1.57
 546.07nm=3.12、587.5618nm=3.18、656.2725nm=1.51
※OBJECT DISTANCE   INF

FIG. 25

| STATE | AXIAL DISPLACEMENT [μm] a | DISPLACEMENT OF IMAGE SURFACE POSITION WITH RESPECT TO h0 [μm] | | | | DIFFERENCE BETWEEN IMAGE SURFACE POSITIONS +y to -y, h0.8 [μm] | | DIFFERENCE BETWEEN IMAGE SURFACE POSITIONS PER UNIT AXIAL DISPLACEMENT | | AVERAGE VALUE (=α) | |
|---|---|---|---|---|---|---|---|---|---|---|---|
| | | +y tan. b | +y sag. c | -y tan. d | -y sag. e | tan. b-d | sag. c-e | tan. (b-d)/a | sag. (c-e)/a | ave. [(b-d)/a] tan. | ave. [(c-e)/a] sag. |
| DESIGN VALUE | 0 | -1.0 | -3.0 | -1.0 | -3.0 | 0.0 | 0.0 | — | — | — | — |
| AXIAL DISPLACEMENT s2 to s1 (L1) | 1 | -18.3 | -7.1 | -1.3 | 0.9 | -17.0 | -8.0 | -17.0 | -8.0 | -16.75 | -7.63 |
| | 2 | -26.8 | -10.7 | 6.9 | 4.2 | -33.7 | -14.9 | -16.9 | -7.4 | | |
| | 3 | -34.4 | -14.5 | 14.7 | 8.0 | -49.1 | -22.5 | -16.4 | -7.5 | | |
| AXIAL DISPLACEMENT s4 to s3 (L2) | 1 | -19.2 | -6.0 | 0.0 | -0.4 | -19.2 | -5.6 | -19.2 | -5.6 | -18.31 | -5.39 |
| | 2 | -28.1 | -8.5 | 8.0 | 1.8 | -36.1 | -10.3 | -18.0 | -5.2 | | |
| | 3 | -36.6 | -11.2 | 16.5 | 4.9 | -53.1 | -16.1 | -17.7 | -5.4 | | |
| AXIAL DISPLACEMENT s3 to s2 (L1-L2) | 1 | -20.1 | -7.1 | -0.5 | 0.9 | -19.6 | -8.0 | -19.6 | -8.0 | -18.55 | -7.88 |
| | 2 | -28.8 | -11.2 | 9.4 | 4.2 | -38.2 | -15.4 | -19.1 | -7.7 | | |
| | 3 | -35.0 | -15.2 | 16.0 | 8.7 | -50.9 | -23.9 | -17.0 | -8.0 | | |
| AXIAL DISPLACEMENT s6 to s5 (L3) | 3 | -9.4 | -1.9 | -11.4 | -3.4 | 2.0 | 1.6 | 0.7 | 0.5 | 0.67 | 0.52 |
| | 5 | -8.1 | -1.8 | -11.4 | -4.1 | 3.3 | 2.3 | 0.7 | 0.5 | | |
| | 10 | -7.0 | 0.0 | -13.8 | -5.7 | 6.8 | 5.7 | 0.7 | 0.6 | | |
| AXIAL DISPLACEMENT s5 for s4 (L2-L3) | 3 | -5.5 | -2.4 | -14.3 | -3.1 | 8.9 | 0.6 | 3.0 | 0.2 | 2.89 | 0.19 |
| | 5 | -2.5 | -2.3 | -17.0 | -3.4 | 14.6 | 1.1 | 2.9 | 0.2 | | |
| | 10 | 4.2 | -2.3 | -23.9 | -3.7 | 28.1 | 1.3 | 2.8 | 0.1 | | |

| α sag. 2 | −7.63 |
|---|---|
| α sag. 3 | −7.88 |
| α sag. 4 | −5.39 |
| α tan. 2 | −16.75 |
| α tan. 3 | −18.55 |
| α tan. 4 | −18.31 |
| α tan. 5 | 2.89 |

| | decenter [μm] | | adjust dec. [μm] | |
|---|---|---|---|---|
| factor | L1 | L2 | L1-2 | L2-3 |
| dec. | 3 | 3 | −5.0 | 4.6 |

LENS ALIGNING DEVICE AND IMAGE CAPTURING LENS

This Nonprovisional application claims priority under 35 U.S.C. §119(a) on Patent Application No. 2011-130610 filed in Japan on Jun. 10, 2011 and Patent Application No. 2012-055088 filed in Japan on Mar. 12, 2012, the entire contents of which are hereby incorporated by reference.

TECHNICAL FIELD

The present invention relates to a lens aligning device for adjusting decentering an image capturing lens including a plurality of lenses by aligning the decentering. The present invention also relates to an image capturing lens which has been subject to an alignment with use of the lens aligning device.

BACKGROUND ART

An alignment of an image capturing lens to be mounted in a camera module for a portable device or a mobile device needs to be carried out in a short period of time in view of productivity of the image capturing lens. It has been conventionally preferred that conditions for completing an alignment in the alignment be clear. In recent years, portable devices are provided in various models. As such, it is expected that a lens aligning device which carries out an alignment of an image capturing lens included in a portable device be highly versatile. Further, in a case of a wafer-level lens, development of which has been popular in recent years, it is expected that (relative) decentering generated between) (i) lenses included in one of a plurality of lens arrays and (ii) lenses included in the other of the plurality of lens arrays be corrected by the alignment when the plurality of lens arrays are combined with each other.

Note that the term "decentering" denotes displacement in which an optical axis of a lens is deviated from its proper, ideal position. Examples of the decentering encompass (i) a phenomenon (hereinafter referred to as "parallel decentering") in which the optical axis of the lens is shifted in parallel from the ideal position, (ii) a phenomenon (hereinafter referred to as "inclination decentering") in which the optical axis of the lens is inclined with respect to the ideal position, and (iii) a combination of these phenomena. The decentering occurs, for example, (i) between both surfaces (front surface and back surface) of a lens or (ii) between a lens and another lens.

The wafer-level lens is an image capturing lens manufactured by carrying out a step in which (i) a plurality of lens arrays, each of which lens arrays includes a wafer and a plurality of lenses, are combined with each other and (ii) a product thus obtained by combining the plurality of lens arrays with each other is divided by each combination of lenses included in the respective plurality of lens arrays. The step is also called a wafer-level lens process.

Patent Literature 1 discloses a lens aligning device which (i) calculates, on the basis of an MTF (modulation transfer function) of an image capturing lens including lens to be subject to an alignment, a defocus characteristic of the image capturing lens, (ii) calculates an inclination of an image surface on the basis of the defocus characteristic, and (iii) calculates, on the basis of the inclination of the image surface, an alignment amount of the lens to be subject to the alignment. Note that the alignment amount of the lens means a direction and a distance of movement of the lens that is generated to move while a corresponding alignment is being carried out.

Note that "MTF" means an index indicating a change in contrast of an image formed on an image surface, which change is generated as the image surface is moved in an optical axis direction. The larger the MTF, the higher resolution power can be determined to be exerted on the formation of the image on the image surface.

Patent Literature 2 discloses a lens unit aligning device which carries out an alignment so that a decentering amount of a combined lens (lens unit to be examined), constituted by a plurality of lenses, is not higher than a predetermined value. Note that the decentering amount of a lens means a direction and a distance which indicate decentering of the lens.

Specifically, in the lens unit aligning device disclosed in Patent Literature 2, light emitted from a point source of light is converted into a parallel light flux by means of a first collimating lens. Then, the parallel light flux is caused to enter the combined lens. A decentering amount of the combined lens is calculated from light rays, which are obtained by converting light emitted from the combined lens into a parallel light flux by means of a second collimating lens. A lens for adjustment is moved on the basis of the decentering amount thus calculated. Thus, the alignment is carried out.

Patent Literature 3 and 4 each disclose a method for manufacturing an image capturing lens through the wafer-level lens process.

CITATION LIST

Patent Literature

Patent Literature 1
Japanese Patent Application Publication, Tokukai, No. 2010-230745 A (Publication date: Oct. 14, 2010)
Patent Literature 2
Japanese Patent Application Publication, Tokukai, No. 2008-158125 A (Publication date: Jul. 10, 2008)
Patent Literature 3
Japanese Patent Application Publication, Tokukai, No. 2010-266667 A (Publication date: Nov. 25, 2010)
Patent Literature 4
Japanese Patent Application Publication, Tokukai, No. 2011-13576 A (Publication date: Jan. 20, 2011)

SUMMARY OF INVENTION

Technical Problem

In the alignment based on the MTF of the image capturing lens according to Patent Literature 1, the lens aligning device has information, such as shape and thickness of lenses constituting the image capturing lens, as a necessary element for carrying out the alignment. Because of this, algorithm for carrying out the alignment becomes complicated and a condition for completing the alignment becomes unclear. This causes a problem that versatility of the lens aligning device becomes low.

Here, such an unclear convergence condition of the alignment means that an alignment amount of the image capturing lens is not defined clearly.

Specifically, even if the MTF of the image capturing lens having an arbitrary decentering amount is measured, a result of this measurement cannot give information on the decentering amount of the image capturing lens. Further, a relationship between the alignment amount and the measurement result of the MTF of the image capturing lens is not necessarily in proportion to each other.

Accordingly, there is a case where a best alignment amount (aligning position) cannot be selected from some possible alignment amounts on the basis of the measurement result of the MTF. In such case, the image capturing lens cannot complete the alignment.

As a result, in the alignment based on the MTF of the image capturing lens according to Patent Literature 1, the convergence condition of the alignment is not always defined clearly. This causes a problem that the alignment amount may become unclear.

Further, the alignment according to Patent Literature 1 includes a process to measure contrast in order to measure the MTF.

Here, consider a case where the image capturing lens to be subjected to an alignment is made up of three lenses. Note that the three lenses are a first lens, a second lens, and a third lens arranged in this order between an object and an image surface of the image capturing lens.

In a case where the contrast in the alignment according to Patent Literature 1 is measured, the third lens is necessary for adjusting positions of the first lens and the second lens of the image capturing lens including three or more lenses.

Here, a position of the third lens with respect to the first lens and/or the second lens may affect the positions of the first and second lenses to be adjusted by the alignment. In other words, the alignment of the first, second, and third lenses cannot be carried out separately.

Further, in a case where the alignment of the first and the second lenses is carried out, it is necessary to combine, with the first and second lenses, the third lens which has not been subjected to the alignment yet.

As early described, the lens aligning device according to Patent Literature 1 has a problem in that a structure of the device becomes complicated in terms of both software and hardware.

The lens aligning device disclosed in Patent Literature 1 has low versatility, hence, there arises a problem that the lens aligning device takes time to match various models of portable devices. Further, the lens aligning device disclosed in Patent Literature 1 has a problem in that the structure of the device becomes complicated. The low versatility causes development of new portable devices to be delayed, and complication of the structure of the device causes increase in cost of the device.

In an alignment based on the measurement of decentering according to Patent Literature 2, a decentering amount of a combined lens is adjusted to fall within a range of a desired value.

Here, even in a case where the decentering of the whole combined lens is minimized, small decentering of a plurality of lenses constituting the combined lens is not always good. That is, decentering generated between different lenses constituting one combined lens has an appropriate correlation of the alignment amount based on a decentering amount generated between both surfaces of each of the lenses constituting the combined lens, and the appropriate correlation can minimize the decentering of the whole combined lens.

The appropriate correlation of the alignment amounts is out of consideration in the lens unit aligning device disclosed in Patent Literature 2. As a result, the lens unit aligning device disclosed in Patent Literature 2 causes a problem that a manufacturing tolerance of the image capturing lens may be limited too excessively and strictly, i.e., an allowable range of the manufacturing error may be narrowed more than necessary. This further causes a problem that the lens unit aligning device disclosed in Patent Literature 2 has difficulty in manufacturing of lenses of the image capturing lens and therefore improvement in productivity of the image capturing lens becomes difficult.

Patent Literatures 3 and 4 each disclose a method for manufacturing an image capturing lens with a wafer-level lens process. In a case where the image capturing lens (wafer-level lens) is manufactured by the aforementioned method, an alignment of the image capturing lens is a problem.

The alignment of the image capturing lens manufactured by the method disclosed in Patent Literature 3 or 4 with use of the technique disclosed in Patent Literature 1 or 2 causes the following problems in addition to the aforementioned problems.

Specifically, the alignment is carried out with use of a lens array, so that a plurality of lenses included in the lens array have at least the following problems: increase in pitch error between the plurality of lenses; increase in axis for adjusting displacement of the lens array in a rotation direction around an optical axis of the lenses; whether or not the plurality of lenses constituting the image capturing lens can be subjected to the alignment.

The present invention has been made in view of the aforementioned problems, and one object of the present invention is to provide a lens aligning device which (i) has a simple structure, (ii) can improve productivity of an image capturing lens, and (iii) has a high versatility, and an image capturing lens subjected to alignment by the lens aligning device.

Solution to Problem

In order to attain the aforementioned object, according to the present invention, a lens aligning device for adjusting a decentering amount of an image capturing lens made up of at least a first lens and a second lens, the first lens and the second lens being arranged, adjacent to each other in this order, between an object and an image surface, said lens aligning device adjusting the image capturing lens by moving at least one of the first lens and the second lens, said lens aligning device includes: a decentering measurement section for measuring a first lens decentering amount which is a decentering amount of a second surface of the first lens with respect to a first surface of the first lens, the first surface being located on an object side, the second surface being located on an image surface side; a target value calculation section for calculating a target inter-lens decentering amount based on the following Formula (1), the target inter-lens decentering amount being a target decentering amount of a third surface of the second lens with respect to the second surface, the third surface being located on the object side, $$\text{target inter-lens decentering amount} = \text{decentering amount of first lens} \times (-2) \quad (1); \text{and}$$

a lens moving section for moving at least one of the first lens and the second lens so that an inter-lens decentering amount which is a decentering amount of the third surface with respect to the second surface matches the target inter-lens decentering amount.

The aforementioned arrangement does not need to incorporate, into algorithm for carrying out the alignment, information (such as shapes and thicknesses of the lenses constituting the image capturing lens) as a necessary element for carrying out an alignment (i.e., adjustment of the decentering amount). For this reason, the algorithm can be simplified, and a convergence condition of the alignment is defined clearly. This can improve versatility of the aligning device.

Here, the clear convergence condition of the alignment means that it is possible to set, to a single alignment amount, an ideal alignment amount of the image capturing lens.

That is, according to the alignment based on MTF of the image capturing lens as described above, the condition for completing the alignment becomes unclear. On the contrary, according to the aforementioned arrangement, an ideal alignment amount is set to a single alignment amount on the basis of the decentering amounts caused by both surfaces of each of the lenses constituting the image capturing lens. Therefore, the convergence condition of the alignment in manufacturing operation can be defined clearly on the basis of detecting accuracy and adjusting accuracy of the device.

Further, the aforementioned arrangement makes it possible to carry out the alignment of the image capturing lens by combining the first lens and the second lens in accordance with the decentering amounts caused by both surfaces of the first lens, i.e., by establishing an appropriate correlation of the alignment amounts so that the decentering amount of the image capturing lens can be optimized.

Accordingly, the lens aligning device makes it possible to reduce a possibility of limiting a manufacturing tolerance of the image capturing lens too excessively and strictly, that is, a possibility of reducing a range of allowable manufacturing errors of the image capturing lens more than necessary. Consequently, the aforementioned arrangement prevents difficulty in manufacturing of the lenses of the image capturing lens and therefore improve productivity of the image capturing lens.

In order to attain the aforementioned object, a lens aligning device for adjusting a decentering amount of an image capturing lens made up of at least a first lens, a second lens, and a third lens, the first through third lenses being arranged, adjacent to each other in this order, between an object and an image surface, the lens aligning device adjusting the image capturing lens by moving at least one of the first lens, the second lens, and the third lens, said lens aligning device includes: a decentering measurement section for measuring (i) a first lens decentering amount which is a decentering amount of a second surface of the first lens with respect to a first surface of the first lens and (ii) a second lens decentering amount which is a decentering amount of a fourth surface of the second lens with respect to a third surface of the second lens, the second surface being located on an image surface side, the first surface being located on an object side, the fourth surface being located on the image surface side, the third surface being located on the object side; a target value calculation section for (i) calculating a first target inter-lens decentering amount which is a target value of a decentering amount of the third surface with respect to the second surface and then (ii) calculating a second target inter-lens decentering amount which is a target value of a decentering amount of a fifth surface of the third lens, the fifth surface being located on the object side with respect to the fourth surface; and a lens moving section for (i) moving at least one of the first lens and the second lens so that a first inter-lens decentering amount which is a decentering amount of the third surface with respect to the second surface matches the first target inter-lens decentering amount and then (ii) moving at least one of the first lens, the second lens, and the third lens so that a second inter-lens decentering amount which is a decentering amount of the fifth surface with respect to the fourth surface matches the second target inter-lens decentering amount, the target value calculation section setting a plurality of expected values to each of the first lens decentering amount, the first inter-lens decentering amount, the second lens decentering amount, the second inter-lens decentering amount, and a third lens decentering amount which is a decentering amount of a sixth surface of the third lens with respect to the fifth surface, the sixth surface being located on the image surface side, carrying out the following processes, for each of the plurality of expected values, with respect to each of a sagittal image surface and a tangential image surface of the image capturing lens: (I) calculating a first-second displacement amount and a first-third displacement amount, the first-second displacement amount being a displacement amount, in an optical axial direction of the image capturing lens, of (a) a second image surface position at a second position with respect to (b) a first image surface position at a first position corresponding to a center image height of the image capturing lens, the second position being apart, by a predetermined distance y (0<y), from the first position in a direction along normal to the optical axis of the image capturing lens, the first-third displacement amount being a displacement amount, in the optical axial direction of the image capturing lens, of (c) a third image surface position at a third position with respect to (d) the first image surface position at the first position in the optical direction of the image capturing lens, the third position being apart, by a predetermined distance −y, from the first position in the direction along the normal to the optical axis of the image capturing lens; (II) calculating a difference between the first-second displacement amount and the first-third displacement amount; (III) dividing the difference by a corresponding one of the plurality of expected values; (IV) calculating an average value of quotients obtained for the respective plurality of expected values in the process (III); and (V) calculating the first target inter-lens decentering amount based on the following Formula (2) and the second target inter-lens decentering amount based on the following Formula (3), or the first target inter-lens decentering amount based on the following Formula (4) and the second target inter-lens decentering amount based on the following Formula (5),

[Formula 1]

$$\overrightarrow{dec.\ S_3} = \frac{\overrightarrow{dec.\ S_2} \times \alpha_{sag.2} + \overrightarrow{dec.\ S_4} \times \alpha_{sag.4}}{\alpha_{sag.3}} \times -1 \qquad (2)$$

$\overrightarrow{dec.S_2}$: First lens decentering amount $\overrightarrow{dec.S_3}$: First target inter-lens decentering amount $\overrightarrow{dec.S_4}$: Second lens decentering amount

[Formula 2]

$$\overrightarrow{dec.\ S_5} = \frac{-\left(\overrightarrow{dec.\ S_2} \times \alpha_{tan.2} + \overrightarrow{dec.\ S_4} \times \alpha_{tan.4} + \overrightarrow{dec.\ S_3} \times \alpha_{tan.3}\right)}{\alpha_{tan.5}} \qquad (3)$$

$\overrightarrow{dec.S_5}$: Second target inter-lens decentering amount

[Formula 3]

$$\overrightarrow{dec.\ S_3} = \frac{\overrightarrow{dec.\ S_2} \times \alpha_{tan.2} + \overrightarrow{dec.\ S_4} \times \alpha_{tan.4}}{\alpha_{tan.3}} \times -1 \qquad (4)$$

-continued

[Formula 4]

$$\overrightarrow{dec.\ S_5} = \frac{-\left(\overrightarrow{dec.\ S_2} \times \alpha_{sag.2} + \overrightarrow{dec.\ S_4} \times \alpha_{sag.4} + \overrightarrow{dec.\ S_3} \times \alpha_{sag.3}\right)}{\alpha_{sag.5}} \quad (5)$$

where $\alpha_{sag.2}$ is the average value which corresponds to the first lens decentering amount of the sagittal image surface, $\alpha_{tan.2}$ is the average value which corresponds to the first lens decentering amount of the tangential image surface, $\alpha_{sag.3}$ is the average value which corresponds to the first inter-lens decentering amount of the sagittal image surface, $\alpha_{tan.3}$ is the average value which corresponds to the first inter-lens decentering amount of the tangential image surface, $\alpha_{sag.4}$ is the average value which corresponds to the second lens decentering amount of the sagittal image surface, $\alpha_{tan.4}$ is the average value which corresponds to the second lens decentering amount of the tangential image surface, $\alpha_{sag.5}$ is the average value which corresponds to the second inter-lens decentering amount of the sagittal image surface, and $\alpha_{tan.5}$ is the average value which corresponds to the second inter-lens decentering amount of the tangential image surface.

In a case where the number of lenses constituting the image capturing lens is three, the aforementioned arrangement has a same effect as a lens aligning device to which algorithm of Formula (1) is applied.

In addition, according to the aforementioned arrangement, algorithm of Formulae (2) to (5) does not include processing to measure MTF or contrast. As such, in a case where the image capturing lens includes three or more lenses, the position of the third lens with respect to the first lens and/or the second lens does not affect the positions of the first lens and the second lens. Further, it is possible to carry out the alignment of the first, second, and third lenses separately.

As a result, the aforementioned arrangement makes it possible to simplify a structure of the lens aligning device.

When the structure of the device can be simplified, the device can be reduced in cost.

Further, a decentering amount of the image capturing lens of the present invention is adjusted by the lens aligning device of the present invention.

Further, it is preferable that: the decentering amount of the image capturing lens (note that the number of lenses is three) of the present invention is adjusted by the lens aligning device of the present invention; the first lens is a meniscus lens which has a positive refractive power and the first surface which is a convex surface, the second lens has a negative refractive power, and the third lens has a positive refractive power and the sixth surface whose center part has a concave shape and whose peripheral part has a convex shape.

The aforementioned arrangement can realize the image capturing lens subjected to the alignment carried out the lens aligning device of the present invention.

Advantageous Effects of Invention

As early described, a lens aligning device for adjusting a decentering amount of an image capturing lens, the image capturing lens made up of at least a first lens and a second lens, the first lens and the second lens being arranged, adjacent to each other in this order, between an object and an image surface, said lens aligning device adjusting the image capturing lens by moving at least one of the first lens and the second lens, said lens aligning device includes: a decentering measurement section for measuring a decentering amount of the first lens which is a decentering amount of a second surface of the first lens with respect to a first surface of the first lens, the first surface being located on an object side, the second surface being located on an image surface side; a target value calculation section for calculating a target inter-lens decentering amount based on the following Formula (1), the target inter-lens decentering amount being a target decentering amount of a third surface of the second lens with respect to the second surface, the third surface being located on the object side, target inter-lens decentering amount=decentering amount of first lens×(−2)   (1); and a lens moving section for moving at least one of the first lens and the second lens so that a target inter-lens decentering amount which is a decentering amount of the third surface with respect to the second surface matches the target inter-lens decentering amount.

Further, according to the present invention, a lens aligning device for adjusting a decentering amount of an image capturing lens made up of at least a first lens, a second lens, and a third lens, the first through third lenses being arranged, adjacent to each other in this order, between an object and an image surface, the lens aligning device adjusting the image capturing lens by moving at least one of the first lens, the second lens, and the third lens, said lens aligning device includes: a decentering measurement section for measuring (i) a first lens decentering amount of a second surface of the first lens with respect to a first surface of the first lens and (ii) a second lens decentering amount of a fourth surface of the second lens with respect to a third surface of the second lens, the second surface being located on an image surface side, the first surface being located on an object side, the fourth surface being located on the image surface side, the third surface being located on the object side; a target value calculation section for (i) calculating a first target inter-lens decentering amount which is a target value of a decentering amount of the third surface with respect to the second surface and then (ii) calculating a second target inter-lens decentering amount which is a target value of a decentering amount of a fifth surface which is located on the object side with respect to the fourth surface; and a lens moving section for (i) moving at least one of the first lens and the second lens so that a first target inter-lens decentering amount which is a decentering amount of the third surface with respect to the second surface matches the first target inter-lens decentering amount and then (ii) moving at least one of the first lens, the second lens, and the third lens so that a second target inter-lens decentering amount which is a decentering amount of the fifth surface with respect to the fourth surface matches the second target inter-lens decentering amount, the target value calculation section setting a plurality of expected values to each of the first lens decentering amount, the first target inter-lens decentering amount, the second lens decentering amount, the second target inter-lens decentering amount, and a third lens decentering amount which is a decentering amount of a sixth surface of the third lens with respect to the fifth surface, the sixth surface being located on the image surface side, carrying out the following processes, for each of the plurality of expected values, with respect to each of a sagittal image surface and a tangential image surface of the image capturing lens: (I) calculating a first-second displacement amount and a first-third displacement amount, the first-second displacement amount being a displacement amount, in an optical axial direction of the image capturing lens, of (a) a second image surface position at a second position with respect to (b) a first image surface position at a first position corresponding to a center image height of the image capturing lens, the second position being apart, by a predetermined distance y (0<y), from the first position in a direction along normal to the optical axis of the image capturing lens, the first-third displacement amount being a displacement amount, in the optical axial direction of the image capturing lens, of (c) a third image surface position at a third position with respect to (d) the first image surface position at the first position in the optical direction of the image capturing lens, the third position being apart, by a predetermined distance −y, from the first position in the direction along the normal to the optical axis of the image capturing lens; (II) calculating a difference between the first-second displacement amount and the first-third displacement amount; (III) dividing the difference by a corresponding one of the plurality of expected values; (IV) calculating an average value of quotients obtained for the respective plurality of expected values in the process (III); and (V) calculating the first target inter-lens decentering amount based on the following Formula (2) and the second target inter-lens decentering amount based on the following Formula (3), or the first target inter-lens decentering amount based on the following Formula (4) and the second target inter-lens decentering amount based on the following Formula (5), where $\alpha_{sag.2}$ is the average value which corresponds to the first lens decentering amount of the sagittal image surface, $\alpha_{tan.2}$ is the average value which corresponds to the first lens decentering amount of the tangential image surface, $\alpha_{sag.3}$ is the average value which corresponds to the first target inter-lens decentering amount of the sagittal image surface, $\alpha_{tan.3}$ is the average value which corresponds to the first target inter-lens decentering amount of the tangential image surface, $\alpha_{sag.4}$ is the average value which corresponds to the second lens decentering amount of the sagittal image surface, $\alpha_{tan.4}$ is the average value which corresponds to the second lens decentering amount of the tangential image surface, $\alpha_{sag.5}$ is the average value which corresponds to the second target inter-lens decentering amount of the sagittal image surface, and $\alpha_{tan.5}$ is the average value which corresponds to the second target inter-lens decentering amount of the tangential image surface.

Accordingly, the present invention has an effect to provide a lens aligning device which (i) has a simple structure, (ii) can be effective in improvement in productivity of an image capturing lens, and (iii) has a high versatility, and an image capturing lens subjected to the alignment by the lens aligning device.

BRIEF DESCRIPTION OF DRAWINGS

FIG. 4 is a sectional view of a structure of an image capturing lens including two lenses, illustrating a state in which components are mounted on the image capturing lens of FIG. 1. p

FIG. 8 is a table showing design data of the image capturing lens of FIG. 4.

FIG. 9 is a table showing an example design specification of an image capturing module including the image capturing lens of FIG. 4.

FIG. 22 is a table showing design data of the image capturing lens of FIG. 18.

FIG. 23 is a table showing an example design specification of an image capturing module including the image capturing lens of FIG. 18.

FIG. 25 is a table partially showing how an aligning position calculation control mechanism calculates a decentering amount on the basis of a simulation result of a displacement amount of an image surface position in an optical direction, which is generated by decentering of the image capturing lens of FIG. 18.

DESCRIPTION OF EMBODIMENTS

[Structure of Lens Aligning Device for Image Capturing Lens Including Two Lenses]

Figure 1:
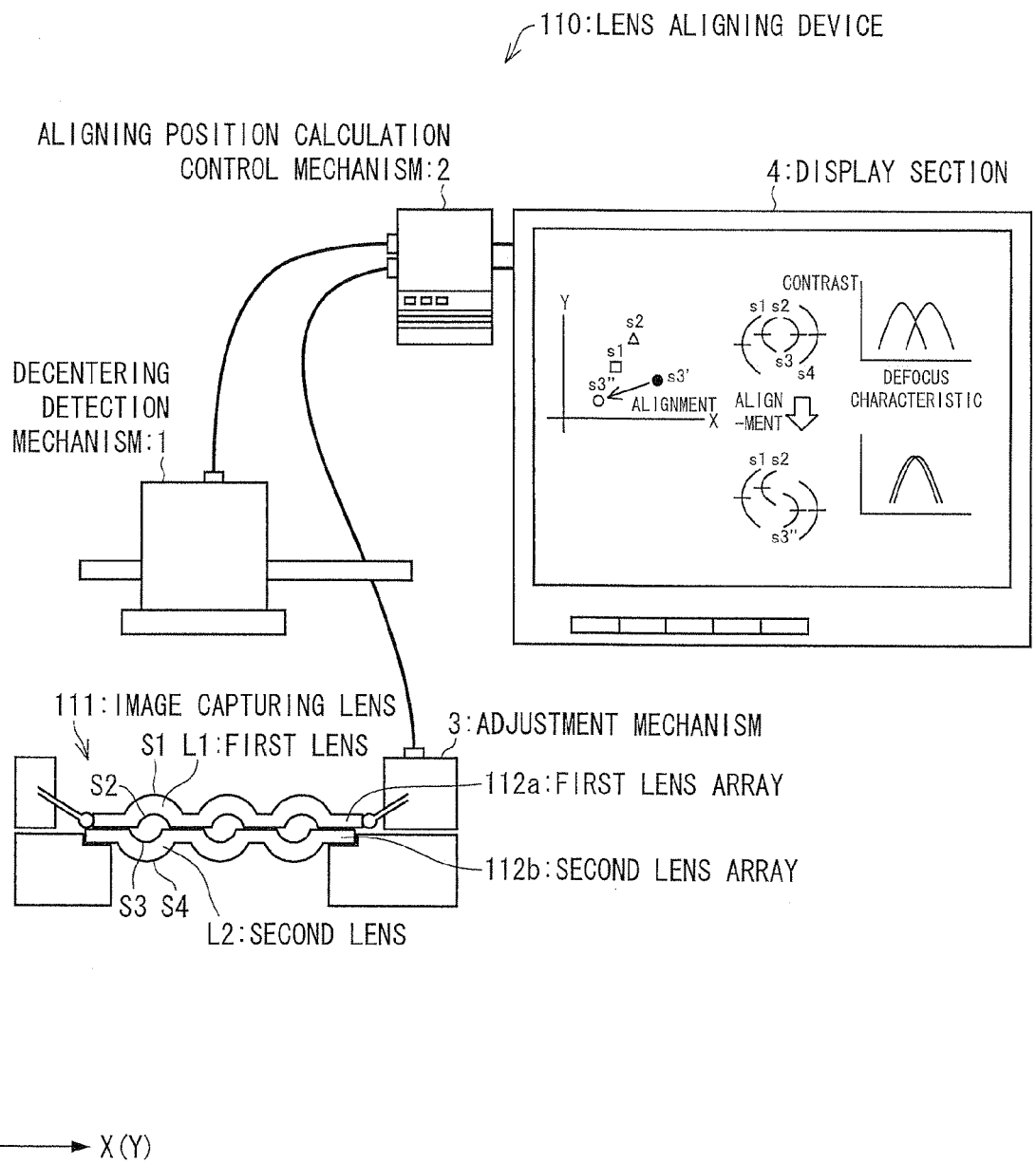
FIG. 1 is a sectional view illustrating a structure of a lens aligning device for an image capturing lens including two lenses.

FIG. 1 is a sectional view illustrating a structure of a lens aligning device for an image capturing lens including two lenses.

A lens aligning device 110 of FIG. 1 carries out an alignment of an image capturing lens 111.

The image capturing lens 111 is made up of two lenses, i.e., a first lens L1 and a second lens L2. The first lens L1 is provided on an object side, and the second lens L2 are provided on an image surface side.

Since an adjustment mechanism 3 moves the first lens L1 and/or the second lens L2, the lens aligning device 110 adjusts a decentering amount of the whole image capturing lens 111 (later described).

As early described, examples of "decentering" encompass parallel decentering and inclination decentering. In the present embodiment, the term "decentering" denotes parallel decentering.

That is, in the present embodiment, displacement generated between (i) an optical axis on one of both surfaces of a lens and (ii) an optical axis on the other of the both surfaces of the lens, which displacement is represented as a parallel movement of one of the optical axes with respect to the other, is referred to as decentering. Displacement generated between an optical axis of a lens and an optical axis of another lens, which displacement is represented as a parallel movement of one of the optical axes with respect to the other, is also referred to as decentering.

The first lens L1 is provided in a form of a first lens array 112a in which a plurality of first lenses L1 are provided on a wafer. The second lens L2 is provided in a form of a second lens array 112b in which a wafer and a plurality of second lenses L2 are provided on a wafer.

Each image capturing lens 111 is defined by a combination of (i) a corresponding first lens L1 provided in the first lens array 112a and (ii) a corresponding second lens L2 provided in the second lens array 112b, in which combination the first lens L1 and the second lens L2 face each other.

The lens aligning device 110 includes a decentering detection mechanism (decentering measurement section) 1, an aligning position calculation control mechanism (target value calculation section) 2, an adjustment mechanism (lens moving section) 3, and a display section 4.

The decentering detection mechanism 1 measures a decentering amount of decentering generated between both surfaces of the first lens L1.

Specifically, the decentering detection mechanism 1 measures, as a first lens decentering amount, a decentering amount of (i) a surface (first surface) S1 of the first lens L1, which surface is located on the object side, with respect to (ii) a surface (second surface) S2 of the first lens L1, which surface is located on the image surface side.

The decentering detection mechanism 1 can measure a decentering amount of (i) a surface (third surface) S3 of the second lens L2, which surface is located on the object side, with respect to (ii) a surface (fourth surface) S4 of the second lens L2, which surface is located on the image surface side.

Alternatively, the decentering detection mechanism 1 can measure a decentering amount of the surface S3 with respect to the surface S2. The decentering amount of the surface S3 with respect to the surface S2 is a decentering amount indicative of displacement generated between an optical axis of the first lens L1 and an optical axis of the second lens L2.

Note that the decentering detection mechanism 1 is preferably structured with use of a CNC image measurement system.

The CNC image measurement system is a system for measuring or inspecting, with high accuracy, sizes of various precision parts or molds with use of a computer-aided image processing technology. The system is also called a CNC image size measuring system or a CNC image size measuring equipment. The CNC image measurement system causes (i) a CCD (Charge Coupled Device) to capture an image with use of an analog technology while applying (a) a universal projector which measures a shape and a size of an object to be inspected by magnifying the object 10 times to 100 times and (b) a function of a measuring microscope in which measurement is carried out with use of a microscope and (ii) a computer to receive and process a captured image with use of a digital technology.

The decentering detection mechanism 1, which is structured with use of the CNC image measurement system, functions as (i) an optical observation mechanism with use of a microscope and (ii) a size measuring mechanism using image processing. The decentering detection mechanism 1 measures a center position of a circular image formed by an edge surface (a part continuing outside an optical effective diameter) of a lens (note: the circular image may not be continuous). In a case where a center position of one of a combination of two surfaces to be measured is displaced with respect to a center of the other, the decentering detection mechanism 1 measures an amount of the displacement as a decentering amount of the one of the two surfaces with respect to the other. Examples of the combination of two surfaces to be measured encompass (i) a combination of the surface S1 and the surface S2, (ii) a combination of the surface S2 and the surface S3, (iii) a combination of the surface S3 and the surface S4.

By structuring the decentering detection mechanism 1 with use of the CNC image measurement system, it becomes possible to realize easily a highly accurate lens aligning device. An amount of parallel decentering can be detected as a whole decentering amount, in particular, in a case where (i) at least one of the first lens L1 and the second lens L2 (and the third lens L3 in a case of a lens aligning device 120 to be later described) has a structure in which a part (edge surface), that is the outside of an optically effective area and is molded integrally with the wafer, in contact with a lens which is arranged to face the at least one of the first lens L1 and the second lens L2 (and the third lens L3) and (ii) an amount of inclination decentering between both surfaces of the at least one of the first lens L1 and the second lens L2 (and the third lens L3) is small. This makes it possible to realize easily the lens aligning device and realize algorithm for carrying out the alignment.

The decentering detection mechanism 1 can be structured with use of a mechanism for carrying out reflective decentering measurement.

According to the decentering detection mechanism 1 which is structured with use of the mechanism for carrying out the reflective decentering measurement, a center position of a lens is measured by the reflective decentering measurement. In a case where displacement is observed between (i) a center position of one of a combination of two surfaces to be measured and (ii) a center position of the other, the decentering detection mechanism 1 detects an amount of the displacement as a decentering amount of the one of the combination of two surfaces with respect to the other.

By structuring the decentering detection mechanism 1 with use of the mechanism for carrying out reflective decentering measurement, it becomes possible to realize easily a highly accurate lens aligning device.

Note that the CNC image measurement system and the reflective decentering measurement are well-known and commonly used techniques as a technique for measuring decentering of a lens. As such, the decentering detection mechanism 1 itself can be easily realized by a person skilled in the art.

The aligning position calculation control mechanism 2 calculates a target inter-lens decentering amount, which is a target value of a decentering amount of the surface S3 with respect to the surface S2, on the basis of the first lens decentering amount measured by the decentering detection mechanism 1. Note that "target value" means a decentering amount to be set in a case where the lens aligning device accomplishes an alignment.

Specifically, the aligning position calculation control mechanism 2 calculates the target inter-lens decentering amount with use of Formula (1).

Target inter-lens decentering amount=decentering
amount of first lens×(−2) (1)

Note that the first lens decentering amount and the target inter-lens decentering amount are each a "decentering amount" having a direction and a distance, that is, a vector amount. Therefore, Formula (1) can be instead expressed as Formula (1)'.

[Formula 5]

$$\overrightarrow{dec.S_3} = \overrightarrow{dec.S_2} \times -2 \quad (1)'$$

$\overrightarrow{dec.S_2}$: First lens decentering amount
  (Vector amount of decentering of surface S2 with respect to surface S1)

$\overrightarrow{dec.S_3}$: Inter-lens decentering amount target value
  (Vector amount (target value) of decentering of surface 53 with respect to surface S2)

Note that algorithm used by the aligning position calculation control mechanism 2 in execution of Formula (1) can be realized by a CPU (central processing unit) or by a hardware logic.

The adjustment mechanism 3 causes the first lens L1 and/or the second lens L2 to move so that the target inter-lens decentering amount, which is a decentering amount of the surface S3 with respect to the surface S2, matches the target inter-lens decentering amount calculated by using Formula (1). Since the adjustment mechanism 3 the first lens L1 and/or the second lens L2, the lens aligning device 110 accomplishes adjustment of the decentering amount of the image capturing lens 111, that is, the alignment of the image capturing lens 111.

The adjustment mechanism 3 can be realized, for example, by a manipulator mechanism.

That is, for example, the aligning position calculation control mechanism 2 controls the adjustment mechanism 3 (which serves as the manipulator mechanism) to make an adjustment, on the basis of information indicative of the target inter-lens decentering amount calculated by using Formula (1), so that the target inter-lens decentering amount matches the target inter-lens decentering amount. The aligning position calculation control mechanism 2 controls the adjustment mechanism 3 to move the first lens L1 and/or the second lens L2, so that the target inter-lens decentering amount matches the target inter-lens decentering amount.

The parallel decentering that is generated in the image capturing lens 111 can be understood as a parallel movement of an optical axis of the image capturing lens 111 in a direction along normal to the optical axis. In FIG. 1, (i) an optical axial direction of the image capturing lens 111 (vertical direction in FIG. 1) corresponds to the Z direction and (ii) a direction along the normal to the optical axis of the image capturing lens 111 corresponds to a given direction extending in a plane defined by the X direction and the Y direction.

As such, the adjustment mechanism 3 is not limited to a specific one, provided that it is capable of moving the first lens L1 and/or the second lens L2 along the plane defined by the X direction and the Y direction, in a case where parallel decentering generated in the image capturing lens 111 is adjusted by the alignment.

In FIG. 1, the adjustment mechanism 3 is configured to move only the first lens L1 (first lens array 112a). However, as a matter of course, the adjustment mechanism 3 can (i) move only the second lens L2 (second lens array 112b) or move both of the first lens L1 and the second lens L2.

The display section 4 is connected with the aligning position calculation control mechanism 2. The display section 4 can display at least (i) decentering amounts in the direction along the normal to the optical axis of the image capturing lens 111, (ii) a correlation between the respective decentering amounts, (iii) a sectional view, corresponding to the correlation, of the image capturing lens 111, and (iv) a defocus characteristic of the image capturing lens 111. That is, the display section 4 can display various types of information useful for the calculation of the target inter-lens decentering amount made by the aligning position calculation control mechanism 2.

The lens aligning device 110 does not need to incorporate, into the algorithm for carrying out the alignment, information (such as shapes and thicknesses of the lenses constituting the image capturing lens 111) as a necessary element for carrying out an alignment. For this reason, the algorithm can be simplified, and the convergence condition of the alignment is defined clearly. This can improve versatility.

Here, the clear convergence condition of the alignment means that it is possible to set, to a single alignment amount, an ideal alignment amount of the image capturing lens 111.

That is, according to the foregoing alignment based on an MTF of the image capturing lens 111, the convergence condition of the alignment becomes unclear. On the contrary, according to the present arrangement, an ideal alignment amount is set to a single alignment amount on the basis of decentering amounts caused by the surfaces S1 through S4. Accordingly, detection accuracy and adjustment accuracy of the lens aligning device 110 make clear the convergence condition of the alignment in a production operation.

The lens aligning device 110 is capable of carrying out the alignment of the image capturing lens 111 with use of a combination of the first lens L1 and the second lens L2 in accordance with an amount of decentering generated between the both surfaces of the first lens L1, in other words, with use of a proper correlation between alignment amounts which optimize decentering of the whole image capturing lens 111.

Accordingly, the lens aligning device 110 makes it possible to reduce a possibility of limiting a production tolerance of the image capturing lens 111 too excessively and strictly, that is, a possibility of reducing a range of allowable manufacturing errors of the image capturing lens 111 more than necessary. Consequently, the lens aligning device 110 prevents difficulty in manufacturing of the lenses of the image capturing lens 111 and can therefore improve productivity of the image capturing lens 111.

The image capturing lens 111, a decentering amount of which is to be adjusted by the lens aligning device 110, is preferably manufactured by (i) combining the first lens array 112a and the second lens array 112b with each other and (ii) dividing the first and second lens arrays 112a and 112b thus combined into individual combinations each made up of a first lens L1 and a second lens L2. That is, the image capturing lens 111 is preferably a wafer-level lens manufactured with use of the wafer-level lens process.

The lens aligning device 110 allows a simple device structure to be employed in the wafer-level lens process. This allows a single alignment to be carried out collectively with respect to a large number of wafer-level lenses. Therefore, the lens aligning device 110 manufactured with use of the wafer-level lens process further contributes to improvement in productivity of the image capturing lens 111. The wafer-level lens process and the wafer-level lens will be later described in detail.

Further, based on the descriptions above, the lens aligning device 110 can be interpreted as follows.

That is, the lens aligning device 110 includes (i) the decentering detection mechanism 1 for detecting information on decentering of and axial displacement of a lens, (ii) the aligning mechanism (adjustment mechanism 3) for adjusting a correlation between lenses, and (iii) a calculation device (aligning position calculation control mechanism 2) having a function of (a) calculating, based on detected decentering information, a proper relationship of displacement between lenses and (b) calculating an amount of alignment to be given to the present state. An entire system of the lens aligning device 110 is structured by the decentering detection mechanism 1, the aligning mechanism (adjustment mechanism 3), and the calculation device (aligning position calculation control mechanism 2). In the lens aligning device 110, alignment information which has been calculated is outputted and an adjustment is made by the aligning mechanism so as to achieve a target alignment relationship.

[Structure of Lens Aligning Device for Image Capturing Lens Including Three Lenses]

For easy explanation, the like reference number will be given to a member having the like function as a member described in the items above, and descriptions on such member will be omitted.

Figure 2:
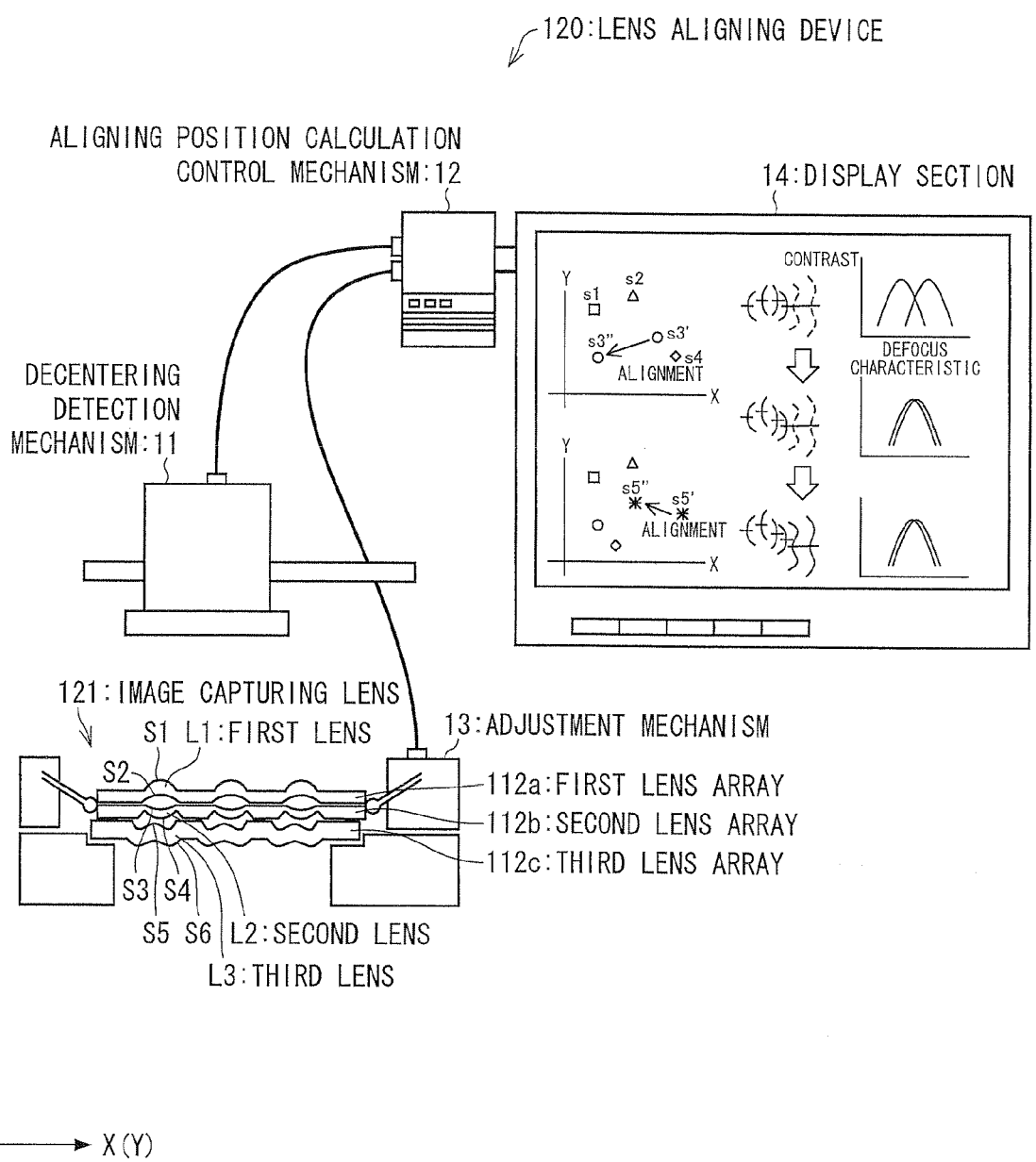
FIG. 2 is a sectional view illustrating a structure of a lens aligning device for an image capturing lens including three lenses.

FIG. 2 is a sectional view illustrating a structure of a lens aligning device for an image capturing lens including three lenses.

A lens aligning device 120 of FIG. 2 carries out an alignment of an image capturing lens 121.

The image capturing lens 121 is made up of three lenses, i.e., a first lens L1, a second lens L2, and a third lens L3. The first lens L1, the second lens L2, and the third lens L3 are arranged in this order so that the first lens L1 is provided on an object side and the third lens L3 is provided on an image surface side.

Since an adjustment mechanism 13 moves at least one of first lens L1, the second lens L2, and the third lens L3, the lens aligning device 120 adjusts a decentering amount of the whole image capturing lens 121 (later described).

Like the first lens L1 constitute the first lens array 112a and the second lens L2 constitute the second lens array 112b, the third lenses L3 is provided in a form of a third lens array 112c in which a plurality of third lenses L3 are provided on a wafer.

Each image capturing lens 121 is defined by a combination of (i) a corresponding first lens L1 provided in the first lens array 112a, (ii) a corresponding second lens L2 provided in the second lens array 112b, and (iii) a corresponding third lens L3 provided in the third lens array 112c, adjacent ones of the first lens L1, the second lens L2, and the third lens L3 facing each other.

The lens aligning device 120 includes a decentering detection mechanism 11, an aligning position calculation control mechanism 12, the adjustment mechanism 13, and a display section 14.

The decentering detection mechanism 11 has, in addition to the function of the decentering detection mechanism 1, a function of measuring a decentering amount of decentering generated between both surfaces of the second lens L2.

Specifically, the decentering detection mechanism 11 measures (i) a decentering amount of a surface S2 with respect to a surface S1 as a first lens decentering amount and (ii) a decentering amount of a surface S4 with respect to a surface S3 as a second lens decentering amount.

The decentering detection mechanism 11 can measure a decentering amount of (i) a surface (sixth surface) S6 of the third lens L3, which surface is located on the object side, with respect to (ii) a surface (fifth surface) S5 of the third lens L3, which surface is located on the image surface side.

The decentering detection mechanism 11 can measure a decentering amount of the surface S3 with respect to the surface S2 and/or a decentering amount of the surface S5 with respect to the surface S4. The decentering amount of the surface S5 with respect to the surface S4 is a decentering amount indicative of displacement generated between an optical axis of the second lens L2 and an optical axis of the third lens L3.

The decentering detection mechanism 11 is preferably structured with use of the CNC image measurement system for the same reason as the decentering detection mechanism 1. The decentering detection mechanism 11 can be realized by the mechanism for carrying out reflective decentering measurement.

The aligning position calculation control mechanism 12 calculates (i) a first target inter-lens decentering amount, which is a target decentering amount of the surface S3 with respect to the surface S2 and (ii) a second target inter-lens decentering amount, which is a target decentering amount of the surface S5 with respect to the surface S4, on the basis of (a) the first lens decentering amount and (b) the second lens decentering amount which are measured by the decentering detection mechanism 11.

In the following description, the decentering amount (which corresponds to the target inter-lens decentering amount in accordance with the lens aligning device 110) of the surface S3 with respect to the surface S2 is referred to as a first target inter-lens decentering amount. The decentering amount of the surface S5 with respect to the surface S4 is referred to as a second target inter-lens decentering amount. The decentering amount of the surface S6 with respect to the surface S5 is referred to as a third lens decentering amount.

Specifically, the aligning position calculation control mechanism 12 calculates each of the first target inter-lens decentering amount and the second target inter-lens decentering amount in the following manner.

(A) Processes (A-1) through (A-3) are carried out with respect to each of the first lens decentering amount, the first target inter-lens decentering amount, the second lens decentering amount, the second target inter-lens decentering amount, and the third lens decentering amount.

(A-1) A plurality of expected values to each of the first lens decentering amount, the first inter-lens decentering amount, the second lens decentering amount, the second inter-lens decentering amount, and a third lens decentering amount.

(A-2) Processes (A-2-1) through (A-2-3) are carried out, for each of the plurality of expected values, with respect to each of a sagittal image surface and a tangential image surface of the image capturing lens 121.

(A-2-1) The target value calculation section (I) calculates a first-second displacement amount and a first-third displacement amount, the first-second displacement amount being a displacement amount, in an optical axial direction of the image capturing lens 121, of (a) a second image surface position at a second position with respect to (b) a first image surface position at a first position corresponding to a center image height of the image capturing lens 121, the second position being apart, by a predetermined distance y (0<y), from the first position in a direction along normal to the optical axis of the image capturing lens 121, the first-third displacement amount being a displacement amount, in the optical axial direction of the image capturing lens 121, of (c) a third image surface position at a third position with respect to (d) the first image surface position at the first position in the optical direction of the image capturing lens 121, the third position being apart, by a predetermined distance −y, from the first position in the direction along the normal to the optical axis of the image capturing lens 121.

(A-2-2)
A difference between the first-second displacement amount and the first-third displacement amount is calculated.

(A-2-3) The difference between the first-second displacement amount and the first-third displacement amount is divided by a corresponding one of the plurality of expected values.

(A-3) An average value of quotients obtained for the respective plurality of expected values in the process (A-2-3).

(B) The first target inter-lens decentering amount is calculated on the basis of the following Formula (2) and the second target inter-lens decentering amount based on the following Formula (3), or the first target inter-lens decentering amount based on the following Formula (4) and the second target inter-lens decentering amount based on the following Formula (5),

[Formula 6]

$$\overrightarrow{dec.\,S_3} = \frac{\overrightarrow{dec.\,S_2} \times \overrightarrow{\alpha_{sag.2}} + \overrightarrow{dec.\,S_4} \times \overrightarrow{\alpha_{sag.4}}}{\alpha_{sag.3}} \times -1 \quad (2)$$

$\overrightarrow{dec.S_2}$: First lens decentering amount $\overrightarrow{dec.S_3}$: First target inter-lens decentering amount $\overrightarrow{dec.S_4}$: Second lens decentering amount

[Formula 7]

$$\overrightarrow{dec.\,S_5} = \frac{-\left(\overrightarrow{dec.\,S_2} \times \overrightarrow{\alpha_{tan.2}} + \overrightarrow{dec.\,S_4} \times \overrightarrow{\alpha_{tan.4}} + \overrightarrow{dec.\,S_3} \times \overrightarrow{\alpha_{tan.3}}\right)}{\alpha_{tan.5}} \quad (3)$$

$\overrightarrow{dec.S_5}$: Second target inter-lens decentering amount

[Formula 8]

$$\overrightarrow{dec.\,S_3} = \frac{\overrightarrow{dec.\,S_2} \times \overrightarrow{\alpha_{tan.2}} + \overrightarrow{dec.\,S_4} \times \overrightarrow{\alpha_{tan.4}}}{\alpha_{tan.3}} \times -1 \quad (4)$$

[Formula 9]

$$\overrightarrow{dec.\,S_5} = \frac{-\left(\overrightarrow{dec.\,S_2} \times \overrightarrow{\alpha_{sag.2}} + \overrightarrow{dec.\,S_4} \times \overrightarrow{\alpha_{sag.4}} + \overrightarrow{dec.\,S_3} \times \overrightarrow{\alpha_{sag.3}}\right)}{\alpha_{sag.5}} \quad (5)$$

where $\alpha_{sag.2}$ is the average value which corresponds to the first lens decentering amount of the sagittal image surface, $\alpha_{tan.2}$ is the average value which corresponds to the first lens decentering amount of the tangential image surface, $\alpha_{sag.3}$ is the average value which corresponds to the first inter-lens decentering amount of the sagittal image surface, $\alpha_{tan.3}$ is the average value which corresponds to the first inter-lens decentering amount of the tangential image surface, $\alpha_{sag.4}$ is the average value which corresponds to the second lens decentering amount of the sagittal image surface, $\alpha_{tan.4}$ is the average value which corresponds to the second lens decentering amount of the tangential image surface, $\alpha_{sag.5}$ is the average value which corresponds to the second inter-lens decentering amount of the sagittal image surface, and $\alpha_{tan.5}$ is the average value which corresponds to the second inter-lens decentering amount of the tangential image surface.

Note that a sagittal image surface means a trajectory of image points formed by light rays (sagittal light rays) contained in a plane (sagittal plane) perpendicular to a plane containing main light rays and an optical axis in a rotationally-symmetrical optical system. The light rays are among light rays entering the optical system from an object point outside the optical axis of the optical system. A tangential image surface (also called meridional image surface) means an image surface which is orthogonal to a light flux of the sagittal light rays and is formed by a light flux (meridional light ray flux) contains main light rays.

The first lens decentering amount, the first target inter-lens decentering amount, the second lens decentering amount, the second target inter-lens decentering amount, and the third lens decentering amount, which are referred to in the process (A) carried out in the aligning position calculation control mechanism 12, are each an expected value set in a simulation carried out by the aligning position calculation control mechanism 12 and are different from a value actually measured by the decentering detection mechanism 11.

Note that algorithm used by the aligning position calculation control mechanism 12 in execution of Formulae (2) through (5) after the process (A) is carried out can be realized by a CPU or by a hardware logic.

It is preferable that the aligning position calculation control mechanism 12 calculates the second target inter-lens decentering amount after the first lens L1 and the second lens L2 are combined with each other.

This allows a highly accurate alignment to be carried out even in the alignment for the image capturing lens 121 including three lenses. In addition, it becomes possible to define a clear convergence condition of the alignment. This can improve versatility.

The adjustment mechanism 13 moves the first lens L1 and/or the second lens L2 so that the first target inter-lens decentering amount, which is a decentering amount of the surface S3 with respect to the surface S2, matches the first target inter-lens decentering amount calculated by using Formula (2) or (4). The adjustment mechanism 13 moves at least one of the first lens L1, the second lens L2, and the third lens L3 so that the second target inter-lens decentering amount, which is a decentering amount of the surface S5 with respect to the surface S4, matches the second target inter-lens decentering amount calculated by using Formula (3) or (5). Since the adjustment mechanism 13 moves the at least one of the first lens L1, the second lens L2, and the third lens L3, the lens aligning device 120 accomplishes adjustment of the decentering amount of the image capturing lens 121, that is, an alignment of the image capturing lens 121.

The adjustment mechanism 13 can be realized, for example, by a manipulator mechanism.

That is, for example, the aligning position calculation control mechanism 12 controls the adjustment mechanism 13 (which serves as the manipulator mechanism) to make an adjustment, on the basis of information indicative of the first target inter-lens decentering amount calculated by using Formula (2) or (4), so that the first target inter-lens decentering amount matches the first target inter-lens decentering amount. The aligning position calculation control mechanism 12 controls the adjustment mechanism 13 to move the first lens L1 and/or the second lens L2 so that the first target inter-lens decentering amount matches the first target inter-lens decentering amount.

Similarly, for example, the aligning position calculation control mechanism 12 controls the adjustment mechanism 13 (which serves as the manipulator mechanism) to make an adjustment, on the basis of information indicative of the second target inter-lens decentering amount calculated by using Formula (3) or (5) so that the second target inter-lens decentering amount matches the second target inter-lens decentering amount. The aligning position calculation control mechanism 12 controls the adjustment mechanism 13 to move the at least one of the first lens L1, the second lens L2, and the third lens L3 so that the second target inter-lens decentering amount matches the second target inter-lens decentering amount.

In FIG. 2, (i) an optical axial direction of the image capturing lens 121 (vertical direction in FIG. 2) corresponds to the Z direction and (ii) a direction along the normal to the optical axis of the image capturing lens 121 corresponds to a given direction extending in a plane defined by the X direction and the Y direction.

Like the adjustment mechanism 3, the adjustment mechanism 13 is not limited to a specific one, provided that it is capable of moving at least one of the first lens L1, the second lens L2, and the third lens L3 along the plane defined by the X direction and the Y direction, in a case where parallel decentering generated in the image capturing lens 121 is adjusted by the alignment.

In FIG. 2, the adjustment mechanism 13 is configured to move only the first lens L1 (the first lens array 112a) and the second lens L2 (the second lens array 112b) while the first lens L1 and the second lens L2 are being combined with each other. However, as a matter of course, the adjustment mechanism 13 may be configured to (i) move only the third lens L3 (the third lens array 112c) or (ii) move both of (a) the first lens L1 and the second lens L2 combined with each other and (b) the third lens L3 (third lens array 112c). Further, as a matter of course, the adjustment mechanism 13 can be configured to move the first lens L1 (the first lens array 112a) and the second lens L2 (the second lens array 112b) separately.

The display section 14 is connected with the aligning position calculation control mechanism 12. The display section 14 has a same function as that of the display section 4. Detailed description of the function of the display section 14 will therefore be omitted.

The lens aligning device 120 has a same effect as that of the lens aligning device 110 (see FIG. 1) in a case where an image capturing lens is made up of three lenses, like the image capturing lens 121.

In addition, according to the lens aligning device 120, a process of measuring an MTF or a contrast is not incorporated into the algorithm in accordance with Formulae (2) through (5). As such, in a case where an image capturing lens includes more than three lenses like the image capturing lens 121, a position of the third lens with respect to the first lens and/or the second lens does not adversely affect positions of the first lens and the second lens. It is further possible to carry out the alignment of the first lens, the second lens, and the third lens separately. This allows the lens aligning device 120 to have a simple device structure and therefore allows a reduction in manufacturing cost of the lens aligning device 120.

The image capturing lens 121, a decentering amount of which is to be adjusted by the lens aligning device 120, is preferably manufactured by (i) combining the first lens array 112a and the second lens array 112b with each other and the second lens array 112b and the third lens array 112c to each other and (ii) dividing the first, second, and third lenses 112a, 112b, and 112c thus combined into individual combinations each made up of a first lens L1, a second lens L2, and a third lens L3. That is, the image capturing lens 121 is preferably a wafer-level lens manufactured with use of the wafer-level lens process.

The lens aligning device 120 allows a simple device structure to be employed in the wafer-level lens process. Accordingly, a large number of wafer-level lenses can be subjected to a single alignment carried out collectively. Therefore, the lens aligning device 120 manufactured with use of the wafer-level lens process further contributes to improvement in productivity of the image capturing lens 121. The wafer-level lens process and the wafer-level lens will be later described in detail.

Further, based on the descriptions above, the lens aligning device 120 can be interpreted as follows.

That is, the lens aligning device 120 includes: the decentering detection mechanism 11 for detecting information on decentering of and axial displacement of a lens; the aligning mechanism (adjustment mechanism 13) for adjusting a correlation between lenses; and a calculation device (aligning position calculation control mechanism 12) having a function of (a) calculating, based on detected decentering information, a proper relationship of displacement between lenses and (b) calculating an amount of alignment to be given to the present state. An entire system of the lens aligning device 120 includes the decentering detection mechanism 11, the aligning mechanism (adjustment mechanism 13), and the calculation device (aligning position calculation control mechanism 12). In the lens aligning device 120, alignment information which has been calculated is outputted and adjustment is made by the aligning mechanism so as to achieve a target alignment relationship. In addition, the lens aligning device 120 preferably carries out (i) an alignment with respect to each of the first lens L1 and the second lens L2 and (ii) an alignment with respect to each of (a) the first and second lenses L1 and L2 thus combined and (b) the third lens L3.

[Method for Manufacturing Image Capturing Lens with Use of Wafer-Level Lens Process]

Neither the image capturing lens 111 (see FIG. 1) nor the image capturing lens 121 (see FIG. 2) is limited to a wafer-level lens. The image capturing lens 111 (see FIG. 1) and the image capturing lens 121 (see FIG. 2) can be each manufactured by a method other than the wafer-level lens process. Examples of the method other than the wafer-level lens process encompass a method in which lenses for constituting an image capturing lens are manufactured by injection molding and the image capturing lens is manufactured with use of the lenses.

Note, however, that by employing, as the image capturing lens 111 and the image capturing lens 121, wafer-level lenses each manufactured with use of the wafer-level lens process, it becomes possible to (i) mass produce the image capturing lens 111 and the image capturing lens 121 in a short time and, accordingly, with a reduced cost and manufacture the image capturing lens 111 and the image capturing lens 121 which can be subjected to a reflow.

Figure 3:
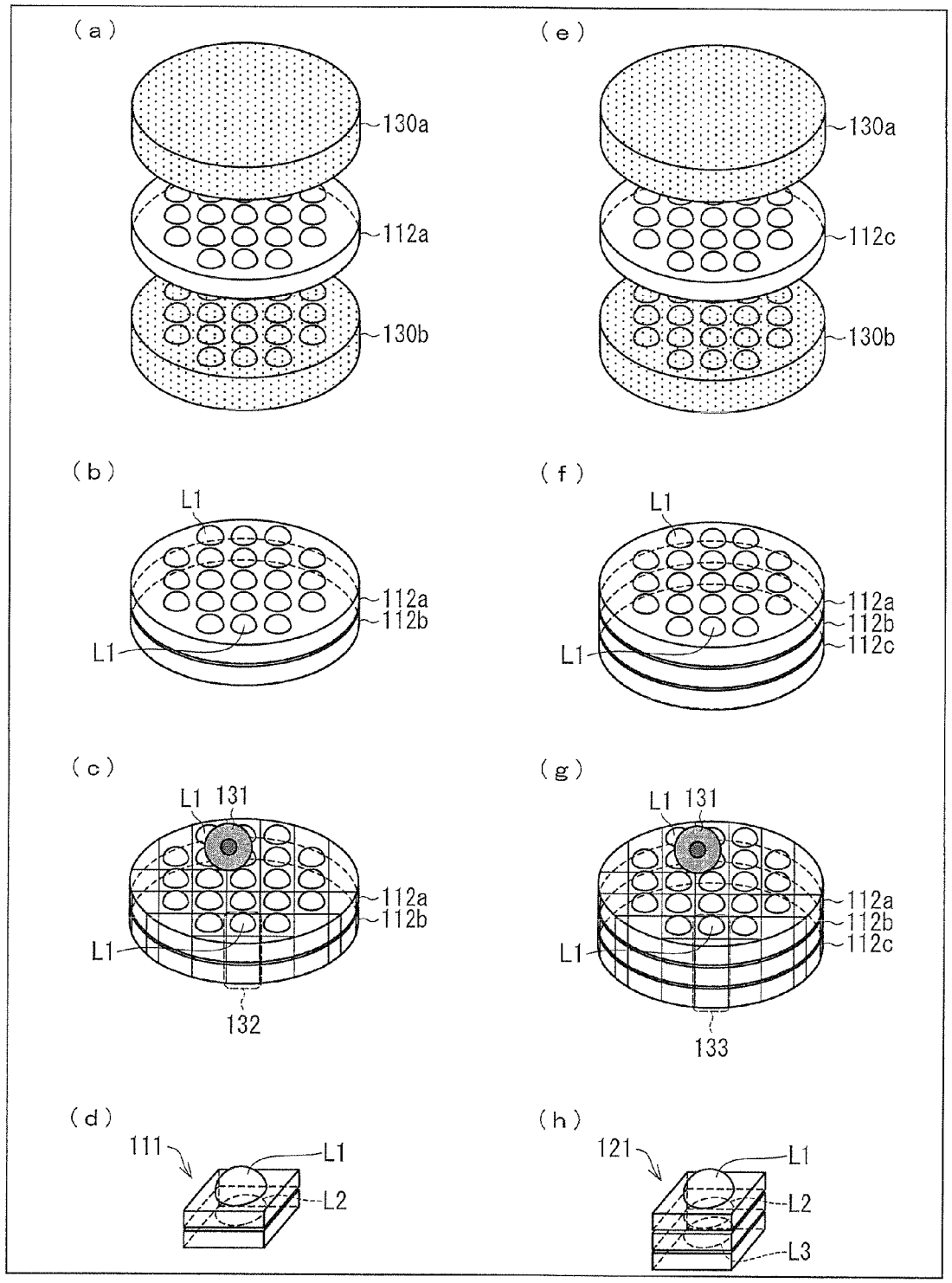
FIG. 3(a) through (h) are perspective views illustrating methods for manufacturing an image capturing lens with a wafer-level lens process.

(a) through (h) of FIG. 3 are perspective views illustrating methods for manufacturing the image capturing lens with use of the wafer-level lens process. Specifically, (a) through (d) of FIG. 3 illustrate a method for manufacturing the image capturing lens 111. (e) through (h) of FIG. 3 illustrate a method for manufacturing the image capturing lens 121.

First, the method for manufacturing the image capturing lens with wafer-level lens process 111 will be described with reference to (a) through (d) of FIG. 3.

A step illustrated in (a) of FIG. 3 will be described below.

A wafer made of a resin (preferably, a thermosetting resin or an ultraviolet curing resin) is sandwiched between an upper mold 130a and a lower mold 130b and is then cured by heating, so that the wafer is shaped into the first lens array 112a.

There are formed, on a surface (transferring surface) of the upper mold 130a, a plurality of concavities each having an internal surface identical to a corresponding one of a plurality of surfaces 51 of the first lenses L1 so that the plurality of surfaces S1 are formed on the wafer.

Likewise, there are formed, on a surface of the lower mold 130b, a plurality of convexities each having an outer surface identical to a corresponding one of a plurality of surfaces S2 of the first lenses L1 so that the plurality of surfaces S2 are formed on the wafer.

The plurality of concavities of the upper mold 130a and the respective plurality of convexities of the lower mold 130b are arranged so as to face each other.

Each combination of (i) a corresponding one of the plurality of surfaces S1 and (ii) a corresponding one of the plurality of surfaces S2, which are formed in the first lens array 112a so as to face each other, will become a corresponding one of the plurality of first lenses L1.

For convenience, (a) of FIG. 3 only illustrates an example of shaping the wafer into the first lens array 112a with use of the upper mold 130a and the lower mold 130b. Note that, in an actual manufacturing, a wafer different from the wafer for the first lens array 112a is also shaped into the second lens array 112b with use of the upper mold 130a and the lower mold 130b in a same way as the example.

That is, the plurality of concavities of the upper mold 130a are changed to a plurality of concavities each having an internal surface identical to a corresponding one of a plurality of surfaces S3 of the second lenses L2. Similarly, the plurality of convexities of the lower mold 130b are changed to a plurality of convexities each having an outer surface identical to a corresponding one of a plurality of surfaces S4. It is possible to manufacture the second lens array 112b, by sandwiching the wafer between the upper mold 130a and the lower mold 130b which are configured as described above.

Each combination of (i) a corresponding one of the plurality of surfaces S3 and (ii) a corresponding one of the plurality of surfaces S4, which are formed in the second lens array 112b so as to face each other, will become a corresponding one of the plurality of second lenses L2.

A step illustrated in (b) of FIG. 3 will be described below.

The first lens array 112a and the second lens array 112b, each of which has been obtained by the molding in the step illustrated in (a) of FIG. 3, are combined with each other.

The first lens array 112a and the second lens array 112b are combined with each other so that the first lenses L1 and the respective second lenses L2 face each other. Preferably, the first lens array 112a and the second lens array 112b are combined with each other so that (i) a one-to-one correspondence is achieved between the first lenses L1 and the second lenses L2 and (ii) each of the first lenses L1 and a corresponding one of the second lenses L2 face each other.

Specifically, after the first lens array 112a and the second lens array 112b are combined with each other, each of the first lenses L1 and a corresponding one of the second lenses L2 are arranged to face each other, it is ideal that an optical axis of each of the first lenses L1 is an extension of an optical axis of a corresponding one of the second lenses L2.

A step illustrated in (c) of FIG. 3 will be described below.

The first and second lens arrays 112a and 112b thus combined are cut by a cutting machine 131.

The cutting machine 131 carries out the cutting so that each lens combination 132, made up of a corresponding one of the first lenses L1 and a corresponding one of the second lenses L2, is cut out.

A lens combination 132 which has been cut out by the cutting machine 131 is illustrated in (d) of FIG. 3.

The lens combination 132 illustrated in (d) of FIG. 3 corresponds to an image capturing lens 111.

Next, a method for manufacturing the image capturing lens 121 with use of the wafer level lens process will be described below with reference to (e) through (h) of FIG. 3. Note, however, that the following description will merely concentrate on a difference from the method for manufacturing the image capturing lens 111 with use of the wafer level lens process, which method has been described with reference to (a) through (d) of FIG. 3.

The following description will discuss a step illustrated in (e) of FIG. 3, only a difference from the step illustrated in (a) of FIG. 3.

In the step illustrated in (e) of FIG. 3, a wafer, which is different from the wafers for the first lens array 112a and the second lens array 112b which have been manufactured in the step illustrated in (a) of FIG. 3, is shaped into the third lens array 112c, in addition to the first lens array 112a and the second lens array 112b. The wafer is shaped into the third lens array 112c with use of the upper mold 130a and the lower mold 130b, in the same way as the first lens array 112a and the second lens array 112b manufactured.

That is, the plurality of concavities of the upper mold 130a are changed to a plurality of concavities each having an internal surface identical to a corresponding one of a plurality of surfaces S5 of the third lenses L3. Similarly, the convexities of the lower mold 130b are changed to a plurality of convexities each having an outer surface identical to a corresponding one of a plurality of surfaces S6. It is possible to manufacture the second lens array 112b, by sandwiching the wafer between the upper mold 130a and the lower mold 130b which are configured as described above.

Each combination of (i) a corresponding one of the plurality of surfaces S5 and (ii) a corresponding one of the plurality of surfaces S6, which are formed in the third lens array 112c so as to face each other, will become a corresponding one of the plurality of third lenses L3.

The following description will discuss a step illustrated in (f) of FIG. 3, only a difference from the step illustrated in (b) of FIG. 3.

The first lens array 112a, the second lens array 112b, and the third lens array 112c, each of which has been obtained by the molding in the step illustrated in (e) of FIG. 3, are combined with each other.

The first lens array 112a, the second lens array 112b, and the third lens array 112c, are combined with each other so that (i) the first lenses L1 and the respective second lenses L2 face each other and (ii) the second lenses L2 and the respective third lenses L3 face each other. Preferably, the first lens array 112a, the second lens array 112b, and the third lens array 112c are combined with each other so that (i) a one-to-one-to-one correspondence is achieved among the first lenses L1, the second lenses L2, and the third lenses L3 and (ii) each of the first lenses L1 and a corresponding one of the second lenses L2 face each other and the corresponding one of the second lenses L2 and a corresponding one of the third lenses L3 face each other.

Specifically, after the first lens array 112a, the second lens array 112b, and the third lens array 112c are combined with each other, each of the first lenses L1, a corresponding one of the second lenses L2, and a corresponding one of the third lenses L3 are arranged so that the first lens L1 and the second lens L2 face each other and the second lens L2 and the third lens L3 face each other, it is ideal that an optical axis of each of the first lenses L1 is (i) an extension of an optical axis of a corresponding one of the second lenses L2 and (ii) an extension of an optical axis of a corresponding one of the third lenses L3.

The following description will discuss a step illustrated in (g) of FIG. 3, only a difference from the step illustrated in (c) of FIG. 3.

The first lens array 112a, the second lens array 112b, and the third lens array 112c thus combined are cut by the cutting machine 131.

The cutting machine 131 carries out the cutting so that lens combination 133, made up of a corresponding one of the first lenses L1, a corresponding one of the second lenses L2, and a corresponding one of the third lenses L3, is cut out.

A lens combination 133 which has been cut out by the cutting machine 131 is illustrated in (h) of FIG. 3.

The lens combination 133 illustrated in (h) of FIG. 3 corresponds to an image capturing lens 121.

Note that, in general, an image capturing lens actually used includes (i) the image capturing lens 111 or the image capturing lens 121 and (ii) components such as an aperture stop and a cover glass for protecting an image surface of the image capturing lens 111 or the image capturing lens 121. The components are mounted on the image capturing lens 111 or the image capturing lens 121. A structure of the image capturing lens on which the components are mounted will be later described.

[Structure of Image Capturing Lens on which Component is Mounted (Two Lenses)]

FIG. 4 is a sectional view of a structure of an image capturing lens including two lenses, illustrating a state in which the components are mounted on the image capturing lens 111 (see FIG. 1).

In the sectional view of FIG. 4, an X direction (vertical to a sheet surface), a Y direction (longitudinal direction on the sheet surface), and a Z direction (horizontal direction on the sheet surface) are defined.

Specifically, the Z direction is a direction in which an optical axis La of an image capturing lens 140 extends. The X direction and the Y direction are respective directions along normal to the optical axis La. The Z direction and the Y direction are perpendicular to each other. The X direction is perpendicular to both the Z direction and the Y direction.

The Z direction of the image capturing lens 140 indicates (i) a direction headed from an object 143 side (object side) to an image surface S9 side (image surface side) and (ii) a direction headed from the image surface S9 side to the object 143 side.

Note that it can be said that the X direction, the Y direction, and the Z direction of FIG. 4 match the X direction, the Y direction, and the Z direction of FIG. 1, respectively.

The image capturing lens 140 is configured so that an aperture stop 142, a first lens L1, a second lens L2, and a cover glass CG in this order are arranged between the object 143 and the image surface S9. The image capturing lens 140 is made up of two lenses, i.e., the first lens L1 and the second lens L2, like the image capturing lens 111.

The cover glass CG has (i) a surface S7 directing to the object 143 side and (ii) a surface S8 directing to an image surface S9 side.

The aperture stop 142 is provided so as to surround a periphery of an effective aperture of a surface S1 of the first lens L1. The aperture stop 142 is provided for limiting a diameter of a bundle of light rays on the optical axis of the light which has entered the image capturing lens 140. This allows the light, which has entered the image capturing lens 140, to appropriately pass through the first lens L1 and the second lens L2.

The object 143 is a target object whose image is formed by the image capturing lens 140. In other words, the object 143 is an object to be shot (i.e., to be captured) by the image capturing lens 140.

The first lens L1 is a well-known meniscus lens having a positive refractive power and the convex surface S1 (convex shape) directing to the object 143 side. Accordingly, a surface S2 of the first lens L1 directing to the image surface S9 side, is a concave surface (concave shape) of the meniscus lens.

"Concave shape" of the lens and "concave surface" of the lens each indicate a part of the lens in which part the lens has a curved hollow, that is, indicate a state in which the lens curves inwardly. Meanwhile, "convex shape" and "convex surface" each indicate a state in which a spherical surface of the lens curves outwardly.

The second lens L2 has a negative refractive power and a concave third surface S3 directing to the object 143 side.

The cover glass CG is provided between the second lens L2 and the image surface S9. The cover glass CG is provided to cover the image surface S9, so as to protect the image surface S9 from physical damage etc.

The image surface S9 is perpendicular to the optical axis La of the image capturing lens 140 and is a surface on which an image is formed. A real image can be observed on a screen (not shown) placed on the image surface S9.

Note that, in FIG. 4, the optical axis of the whole image capturing lens 140 is assumed to be the optical axis La. However, it is ideal that optical axes of the first lens L1 and the second lens L2 are also an extension of the optical axis La.

Figure 5:
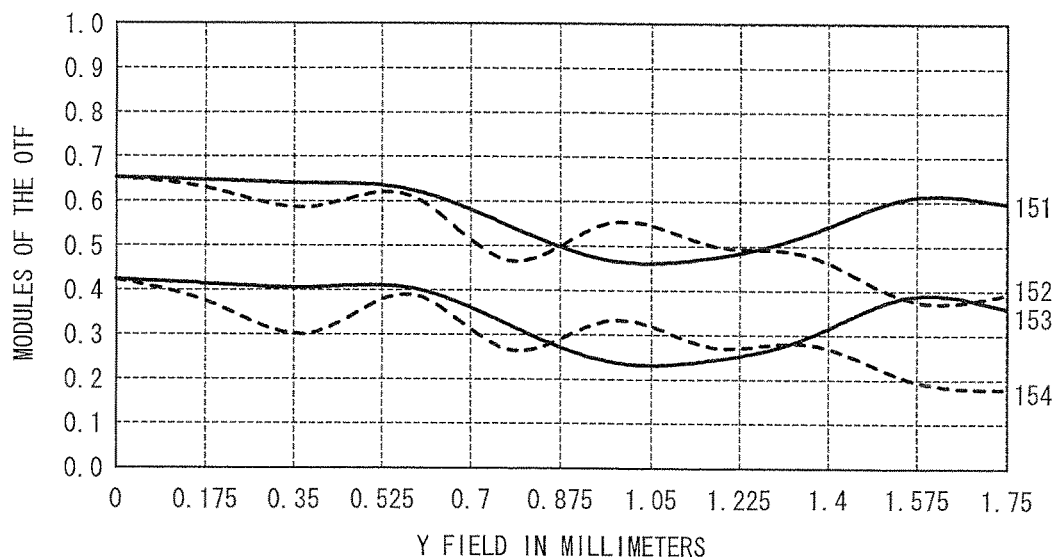
FIG. 5 is a graph showing a MTF—image height characteristic of the image capturing lens of FIG. 4.

FIG. 5 is a graph showing an MTF—image height characteristic of the image capturing lens 140.

Figure 6:
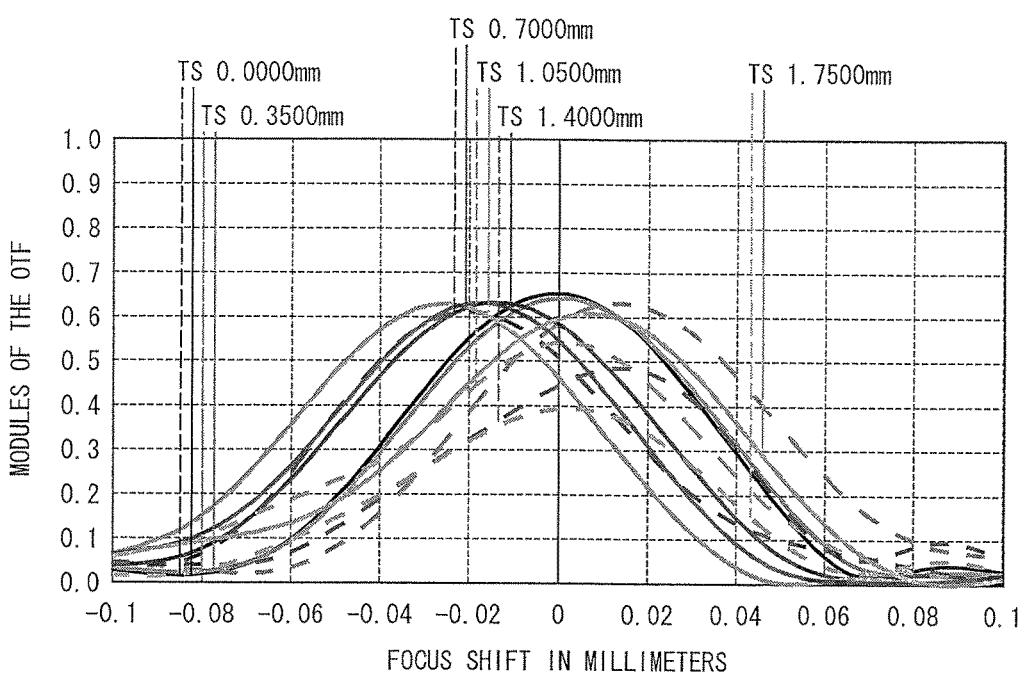
FIG. 6 is a graph showing a defocus MTF of the image capturing lens of FIG. 4.

FIG. 6 is a graph showing a defocus MTF (MTF—focus shift position characteristic) of the image capturing lens 140.

Figure 7:
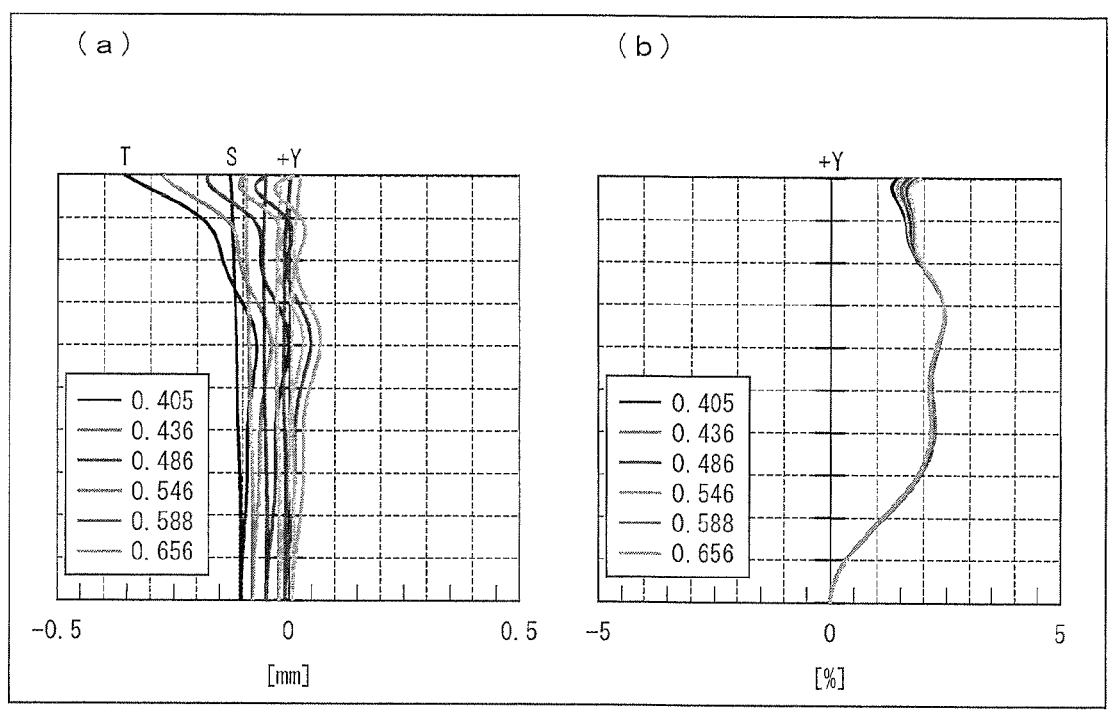
FIG. 7(a) is a graph showing an astigmatic characteristic of the image capturing lens of FIG. 4, and (b) of FIG. 7 is a graph showing a distortion characteristic of the image capturing lens of FIG. 4.

(a) of FIG. 7 is a graph showing an astigmatic characteristic of the image capturing lens 140, and (b) of FIG. 7 is a graph showing a distortion characteristic of the image capturing lens 140.

Vertical axes of the graphs shown in FIG. 5 and FIG. 6 show MTF (no unit).

The horizontal axis of the graph of FIG. 5 is an image height (unit: mm), and the graph shows characteristics of a tangential image surface and a sagittal image surface for the image height his 0 (0 mm) to h1.0 (1.75 mm). Further, FIG. 5 shows (i) a characteristic obtained when a spatial frequency is "Nyquist frequency/4 (71.4 lp/mm)" and (ii) a characteristic obtained when the spatial frequency is "Nyquist frequency/2 (142.9 lp/mm)".

The horizontal axis of the graph of FIG. 6 is a focus shift position (unit: mm), and the graph shows characteristics of each of tangential (T) and sagittal (S) image surfaces for the image heights of h0, h0.2 (0.35 mm), h0.4 (0.7 mm), h0.6 (1.05 mm), h0.8 (1.4 mm), and h1.0. Further, FIG. 6 shows a characteristic obtained when the spatial frequency is "Nyquist frequency/4".

Specifically, (a) of FIG. 7 shows a relationship, in the image capturing lens 140, between the curvature of field (horizontal axis (unit: mm)) and the image height (vertical axis) of the image capturing lens 140. (b) of FIG. 7 shows a relationship, in the image capturing lens 140, between the distortion (horizontal axis (unit: %)) and the image height (the vertical axis).

Note that, in the following description, the MTF of 0.2 or more is considered as high resolution power.

There are two ways to express an image height of the image capturing lens 140 in accordance with the present embodiment. One of them is to express an image height as absolute values (0 mm to 1.75 mm) on the premise that a maximum image height is 1.75 mm. The other is to express an image height as proportions (h0 to h1.0) of the image height to a maximum image height on the premise that the maximum image height is 1 (h1.0). An example relationship between the absolute values and the proportions will be described below.

0 mm=image height h0 (center of image)

0.175 mm=image height h0.1 (height corresponding to a distance between ten percents of the maximum image height and the center of the image)

0.35 mm=image height h0.2 (height corresponding to a distance between twenty percents of the maximum image height and the center of the image)

0.7 mm=image height h0.4 (height corresponding to a distance between forty percents of the maximum image height and the center of the image)

1.05 mm=image height h0.6 (height corresponding to a distance between sixty percents of the maximum image height and the center of the image)

1.4 mm=image height h0.8 (height corresponding to a distance between eighty percents of the maximum image height and the center of the image)

1.75 mm=image height h1.0 (maximum image height)

Further, the Nyquist frequency corresponds to a Nyquist frequency of a sensor (image capturing element) receiving light which has passed through the image capturing lens. That is, the Nyquist frequency is a resolvable spatial frequency calculated on the basis of a pixel pitch of the sensor. Specifically, a Nyquist frequency Nyq. (unit: lp/mm) of the sensor is calculated as follows:

$$Nyq. = 1/(\text{the pixel pitch of the sensor})/2$$

Further, in order to obtain each optical characteristic of the image capturing lens 140, (i) an object distance is assumed to be 1,200 mm and (ii) white light weighted as follows (mixing ratio of wavelengths constituting white light is adjusted as follows) is used as a simulation light source not shown).

404.66 nm=0.13

435.84 nm=0.49

486.1327 nm=1.57

546.07 nm=3.12

587.5618 nm=3.18

656.2725 nm=1.51

Graphs 151 through 154 of FIG. 5 each show the following measurement results. The graph 151 shows an MTF characteristic of the sagittal image surface, which MTF characteristic is obtained when the spatial frequency is "Nyquist frequency/4". The graph 152 shows an MTF characteristic of the tangential image surface, which MTF characteristic is obtained when the spatial frequency is "Nyquist frequency/4". The graph 153 shows an MTF characteristic of the sagittal image surface, which MTF characteristic is obtained when the spatial frequency is "Nyquist frequency/2". The graph 154 shows an MTF characteristic of the tangential image surface, which MTF characteristic is obtained when the spatial frequency is "Nyquist frequency/2".

The MTF of the image capturing lens 140 exceeds 0.2 for any of the image heights of h0 to h1.0 under conditions corresponding to the respective graphs 151 through 153. The MTF of the image capturing lens 140 exceeds 0.2 even under a condition corresponding to the graph 154, provided that the image height is h0 to h0.9 (1.575 mm). Moreover, the MTF does not decrease excessively even for an image height of higher than h0.9. This demonstrates that the image capturing lens 140 achieves good contrast in the periphery of the image (i.e., the image height h1.0 and in the vicinity of h1.0).

At the focus shift position of 0 mm, the MTF in each of the sagittal image surface and the tangential image surface of the image capturing lens 140 exceeds 0.2 (i.e., has high resolution power) for any of the image heights of h0 to h1.0 (see FIG. 6). Note that the focus shift position of 0 mm corresponds to the image surface S9 (see FIG. 4).

As is clear from (a) and (b) of FIG. 7, since the image capturing lens 140 has a small amount of residual aberration (a displacement of magnitudes of aberrations in a direction along normal to the optical axis La is small), the image capturing lens 140 has a good optical characteristic.

FIG. 8 is a table showing design data of the image capturing lens 140.

Items of FIG. 8 are defined as follows.

"Structure": constituents of the image capturing lens 140. Specifically, as to Item "lens", "L1" means the first lens L1 and "L2" means the second lens L2. As to "surface", "S1" through "S4" mean the surfaces S1 through S4, respectively.

"Nd (material)": a refractive index which each of the lenses constituting the image capturing lens 140 has when d line (wavelength: 587.6 nm) passes each of the lenses.

"γD (material)": an Abbe number which each of the lenses constituting the image capturing lens 140 has when the d line passes each of the lenses.

"Effective radius": an effective radius of each of lens surfaces of the surfaces S1 through S4 (radius of a circular region capable of limiting a range of light rays). The unit of the effective radius is mm.

"Curvature": a curvature of each of the lens surfaces of the surfaces S1 through S4. The unit of the curvature is $mm^{-1}$.

"Aspherical surface coefficient": an i-th order aspherical surface coefficient Ai (i is an even number of 4 or more) of an aspherical surface equation (6) constituting an aspherical surface of each of the surfaces S1 through S4. In the aspherical surface equation (6), "Z" is a coordinate in the optical direction (Z direction), "x" is a coordinate in a direction along normal to the optical direction (X direction), "R" is a curvature radius (multiplicative inverse of a corresponding curvature), and "K" is a conic coefficient.

[Formula 10]

$$Z = \frac{x^2 \times 1/R}{1 + \sqrt{1 - (1+K) \times x^2 \times 1/R^2}} + \sum_{\substack{i=4 \\ (even\ number)}} A_i \times x^i \quad (6)$$

FIG. 9 is a table showing an example design specification of an image capturing module including the image capturing lens 140. Note that the design specification of the image capturing module is not shown.

Items of FIG. 9 are defined as follows.

"Sensor": a sensor for use in the image capturing module.

"Size": a size of the sensor, specified by three kinds of values (three dimensional values), i.e., diagonal, horizontal, and vertical values. The unit of the size is mm.

"Pixel pitch": a pixel pitch of the sensor. The unit of the pixel size is μm.

"F number": an F number of the image capturing lens 140. Note that the F number of the image capturing lens is equal to a value which is obtained by dividing an equivalent focal distance of the entire system of the image capturing lens by an incident pupil diameter of an entire system of the image capturing lens.

"Focal length": a focal length of an entire system of the image capturing lens 140. The unit of the focal length is mm.

"Field of view": an angle of view of the image capturing lens 140, which is specified by three kinds of value (three dimensional values), i.e., diagonal, horizontal, and vertical values. The unit of the field of view is deg(°).

"TV distortion": TV distortion of the image capturing lens 140. The unit of the TV distortion is %.

"Relative illumination": an ambient light amount ratio of the image capturing lens 140 at the three points (image heights of h0.6, h0.8, and h1.0). Each ambient light amount ratio means a ratio of light amount obtained at a corresponding one of the image heights with respect to light amount obtained at the image height h0 (at the center of image). The unit of the relative illumination is %.

"CRA (chief ray angle)": a chief ray angle at the three points (image heights of h0.6, h0.8, and h1.0). The unit of the field of view is deg(°).

"Optical length": a total optical length of the image capturing lens 140. The unit of the optical length is mm.

"CG thickness": a thickness, in a direction in which the optical axis La extends, of the cover glass CG provided in the image capturing lens 140. The unit of the CG thickness is mm.

"Hyper focal distance": a hyper focal distance of the image capturing lens 140. The hyper focal distance means an object distance (distance from a lens to an object) obtained when focusing is carried out so that a farthest point of depth of field extends to infinitely. The unit of the hyper focal distance is mm.

"Object distance": an object distance.

"Design wave weight": weighting of white light serving as a simulation light source (detailed description is above).

[Verification of Alignment by Image Capturing Lens on which Component is Mounted (Two Lenses)]

An alignment is verified with use of the image capturing lens 140 of FIG. 4.

When verifying the alignment, the image height h0 (center image height), the image height h0.79, and the image height h(−0.79) are analyzed.

A difference between the image height hL (0<L≤1.0) and the image height (−L) will be described below.

The image height h0 is a center of an image as early described. As a matter of course, the image can exist at a position higher than the image height h0 and a position lower than the image height h0. In other words, in a case where a height of the image height h0 is 0, the image is formed in a region above 0 and in a region below 0.

Normally, "image height hL" encompasses an image height viewed in a region above 0 and an image height viewed in a region below 0. However, in the description of the present embodiment, it is sometimes necessary to treat an image height viewed in a region above 0 and an image height viewed in a region below 0, independently.

In view of the circumstances, in a case where it is necessary to treat an image height viewed in a region above from an image height viewed in a region below 0, independently, the former is expressed as "image height hL", meanwhile, the latter is expressed as "image height h(−L)".

The image height hL and the image height h(−L) have a same distance from the image height h0 but are away from respective opposite directions from the image height h0. Note, however, that the image height hL and the image height h(−L) have a common feature that they are away from the image height h0 in the direction along normal to the optical axis La of the image capturing lens.

Note that "predetermined distance y" and "predetermined distance −y" are also based on the aforementioned idea of the difference of the image height hL and the image height h(−L).

That is, the "predetermined distance y" and the "predetermined distance −y" have a same distance, but are away from respective opposite directions. Further, both the "predetermined distance y" and the "predetermined distance −y" have a common feature that they are away from the image height h0 in the direction along normal to the optical axis La of the image capturing lens.

Figure 10:
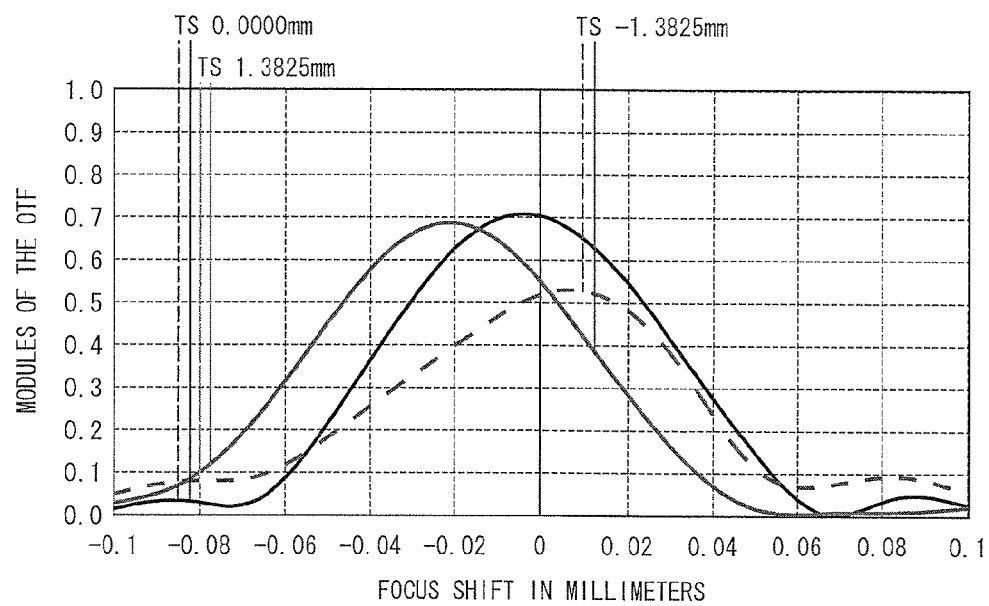
FIG. 10 is a graph showing a defocus MTF of the image capturing lens of FIG. 4 in a case where a spatial frequency is 70 lp/mm.

Also note that a defocus characteristic (defocus MTF) was analyzed in the verification under the condition of a spatial frequency of 70 lp/mm (approximately Nyquist frequency/4). Refer to FIG. 10 as to the detailed defocus characteristic.

Further note that white light weighted as follows was used as a simulation light source (not shown) in the verification.
  455 nm=0.098
  502 nm=0.504
  558 nm=1
  614 nm=0.502
  661 nm=0.098

Figure 11:
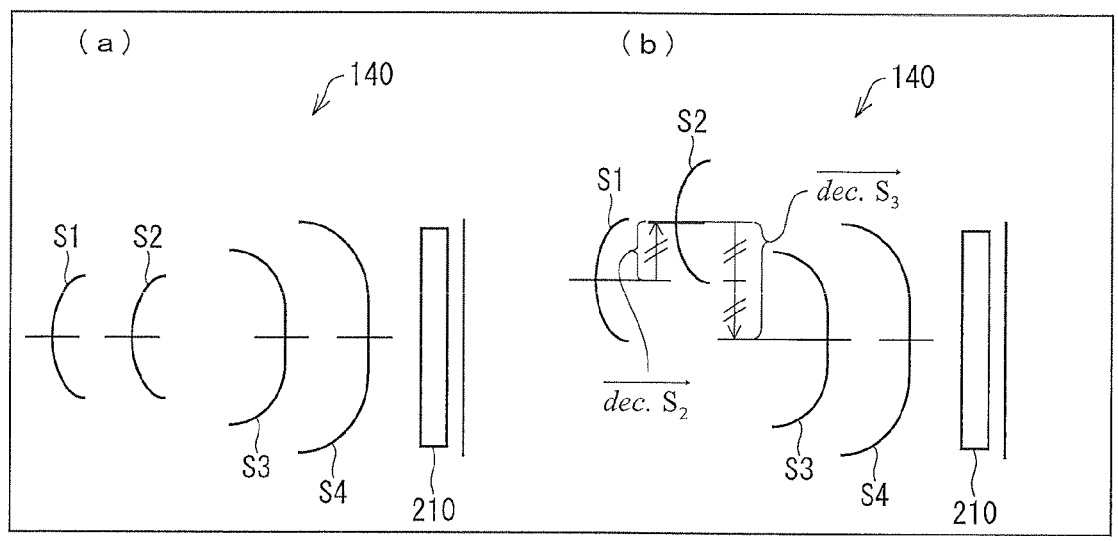
FIG. 11(a) and (b) are sectional views illustrating images in which a first lens and/or a second lens are/is moved when a decentering amount of the whole image capturing lens of FIG. 4 is adjusted on the basis of Formula (1).

(a) and (b) of FIG. 11 are sectional views each schematically illustrating how the first lens L1 and/or the second lens L2 are/is moved when the decentering amount of the whole image capturing lens 140 is adjusted on the basis of foregoing Formula (1). Specifically, (a) of FIG. 11 illustrates a case where such a movement is not needed, i.e., the first lens decentering amount is 0. (b) of FIG. 11 illustrates a case where such a movement is needed, i.e., the first lens decentering amount is not 0.

Note that (a) and (b) of FIG. 11 also illustrate the cover glass CG and the sensor 210.

The following description will discuss an example simulation where the lens aligning device 110 (see FIG. 1) carries out an alignment with respect to the image capturing lens 140.

The following first example simulation is related to a case where the decentering detection mechanism 1 measured a first lens decentering amount of 2 μm.

In a case where the first lens decentering amount is 2 μm, a target inter-lens decentering amount, which is calculated based on Formula (1) by a decentering position calculation control mechanism 2, is −4 μm (4 μm in a direction opposite to a direction in which a displacement of the optical axis of the surface S2 is generated with respect to the surface S1).

The aligning position calculation control mechanism 2 controls the adjustment mechanism 3 to move the first lens L1 and/or the second lens L2 so that the target inter-lens decentering amount matches the target inter-lens decentering amount. That is, the adjustment mechanism 3 moves the first lens L1 and/or the second lens L2 so that a decentering amount of the surface S3 with respect to the surface S2 becomes −4 μm.

The following second example simulation is related to a case where the decentering detection mechanism 1 measured a first lens decentering amount of 5 μm.

In a case where the first lens decentering amount is 5 μm, a target inter-lens decentering amount, which is calculated on the basis of Formula (1) by the decentering position calculation control mechanism 2, is −10 μm (10 μm in a direction opposite to a direction in which a displacement of the optical axis of the surface S2 is generated with respect to the surface S1).

The aligning position calculation control mechanism 2 controls adjustment mechanism 3 to move the first lens L1 and/or the second lens L2 in the same way as the first example simulation so that the decentering of the surface S3 with respect to the surface S2 is −10 μm.

Figure 12:
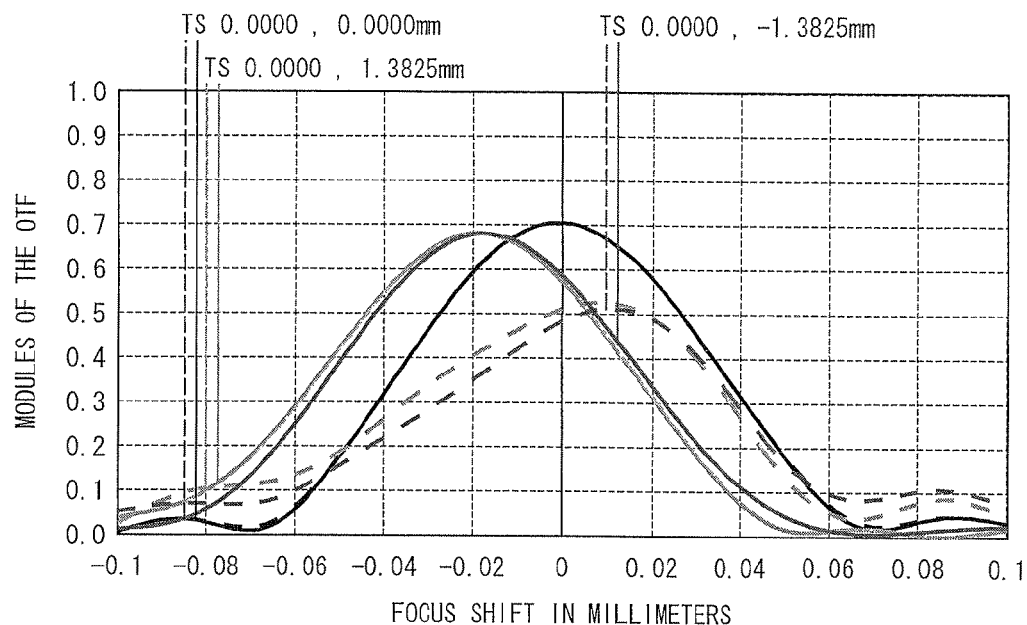
FIG. 12 is a graph showing a defocus MTF of the image capturing lens of FIG. 4 when an alignment of a first example simulation is finished.

FIG. 12 is a graph showing a defocus MTF of the image capturing lens 140, which defocus MTF is obtained when the alignment of the first example simulation is finished.

Figure 13:
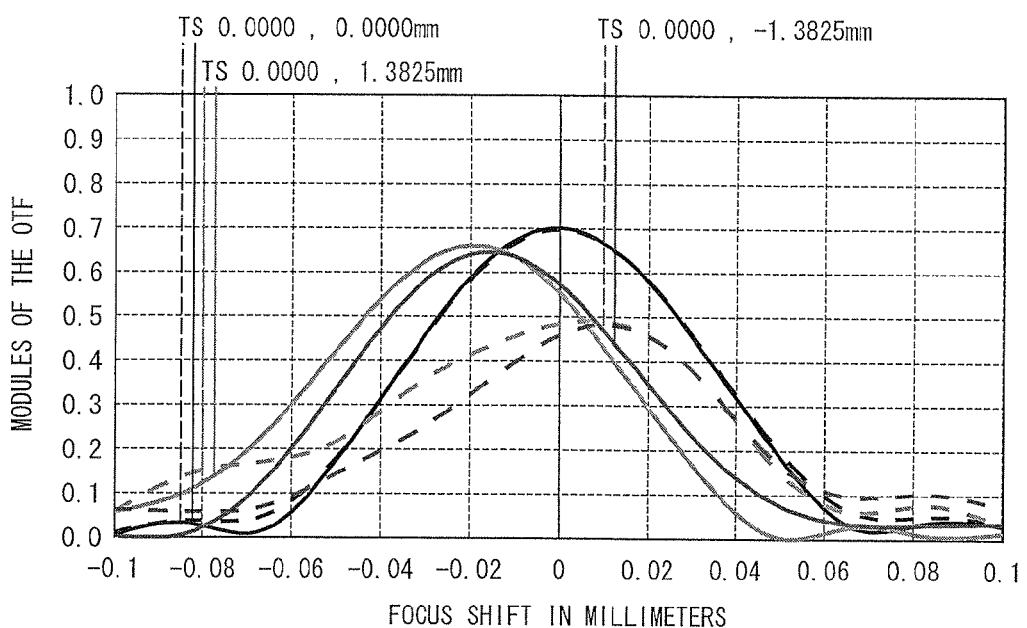
FIG. 13 is a graph showing a defocus MTF of the image capturing lens of FIG. 4 when an alignment of a second example simulation is finished.

FIG. 13 is a graph showing a defocus MTF of the image capturing lens 140, which defocus MTF is obtained when the alignment of the second example simulation is finished.

At the focus shift position of 0 mm, the MTF in each of the sagittal and tangential image surfaces of the image capturing lens 140 exceeds 0.2 for any of the image heights of h0 to h1.0 when the alignment of the first example simulation is finished (see FIG. 12). At the focus shift position of 0 mm, the MTF in each of the sagittal and tangential image surfaces of the image capturing lens 140 exceeds 0.2 for any of the image heights of h0 to h1.0 when the alignment of the second example simulation is finished (see FIG. 13). Note that the focus shift position of 0 mm corresponds to the image surface S9 (see FIG. 4).

Accordingly, the decentering amount of the image capturing lens 140 is adjusted appropriately by the alignment of the first example simulation, and is also adjusted appropriately by the alignment of the second example simulation.

As is clear from Formula (1), the aligning position calculation control mechanism 2 does not consider a second lens decentering amount, which is a decentering amount of the surface S4 with respect to the surface S3, in a case of adjusting a decentering amount of an image capturing lens, including two lenses, such as the image capturing lens 140.

The reason is as follows. In a case of the image capturing lens including two lenses, a degree, to which the defocus characteristic changes in response to a change in the second lens decentering amount, is extremely small. This allows the second lens decentering amount to be relatively large. In other words, an error sensitivity of the second lens decentering amount of the image capturing lens including two lenses is extremely small.

Figure 14:
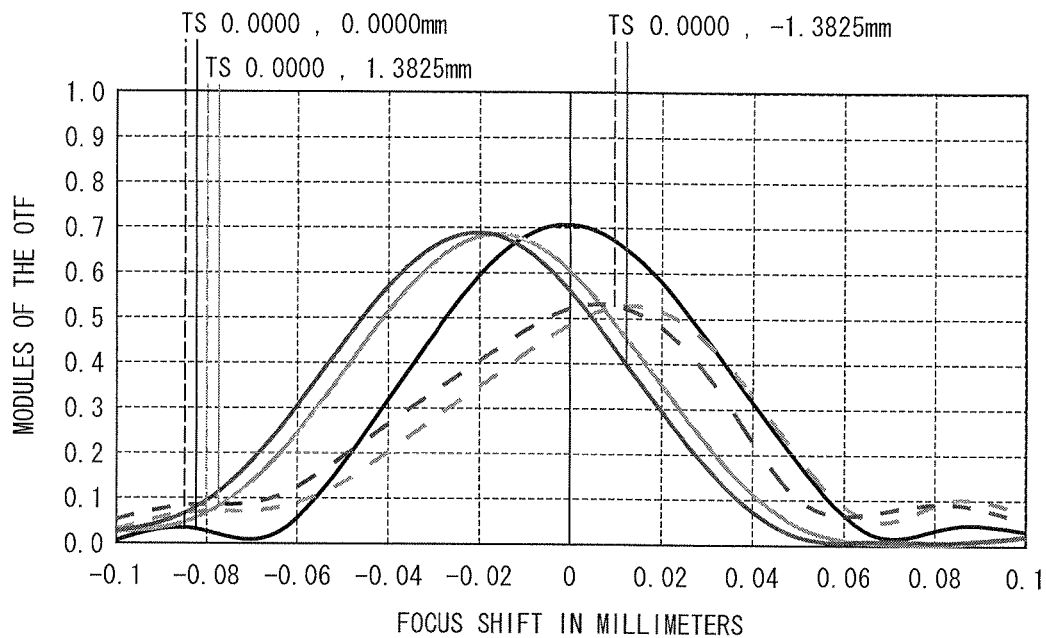
FIG. 14 is a graph showing a defocus MTF of the image capturing lens of FIG. 4 in a case where a second lens amount is 10 μm and a first lens decentering amount and a target inter-lens decentering amount are both 0 μm.

FIG. 14 is a graph showing a defocus MTF of the image capturing lens 140, which defocus MTF is obtained in a case where the second lens amount is 10 μm and the first lens decentering amount and the target inter-lens decentering amount are both 0 μm.

The defocus MTF of FIG. 14 is almost the same as the defocus MTF of each of FIGS. 12 and 13. As is clear from this, the error sensitivity of the second lens decentering amount of the image capturing lens including two lenses is extremely small.

[Tolerance of Alignment Caused by Decentering Generated Between Both Surfaces of Lens]

In regard to the aligning method disclosed in Patent Literature 2, a small decentering amount generated between respective lenses constituting the image capturing lens is not always good only because it is small. As long as any decentering is generated between both surfaces of a lens, there exists an appropriate decentering amount between the respective lenses, which appropriate alignment amount matches the decentering thus generated.

In particular, in an image capturing lens for camera module which is used in a portable device, the decentering, generated between the both surfaces of each of the lenses constituting the image capturing lens, causes relatively greater influences among manufacturing tolerances of the image capturing lens. As such, it is necessary to align the image capturing lens, by taking into consideration the fact that an appropriate alignment amount matches decentering amount generated between both surfaces of a lens.

This will be described below with reference to the image capturing lens 140 of FIG. 4.

Figure 15:
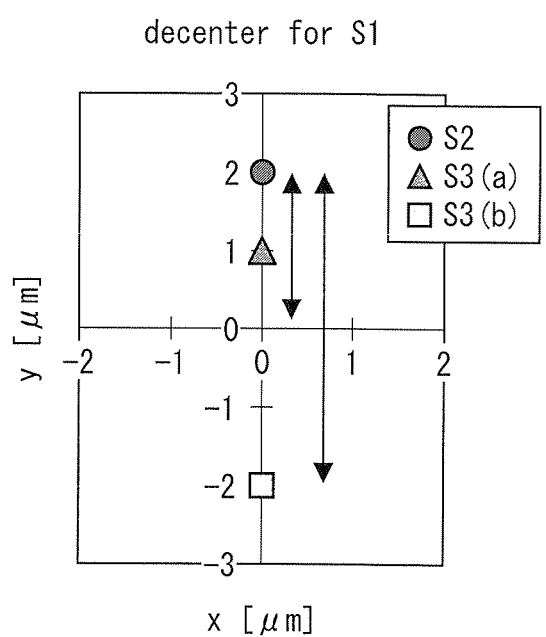
FIG. 15 is a graph showing an example of a positional relationship of optical axes on second and third surfaces of the image capturing lens of FIG. 4 with respect to an optical axis on a first surface.

FIG. 15 is a graph showing an example of a positional relationship, in the image capturing lens 140, between (i) the optical axis on the surface S1 and (ii) the optical axis on the surfaces S2 and S3.

In the graph of FIG. 15, the vertical axis indicates a position in the Y direction (unit: μm), and the horizontal axis indicates a position in the X direction (unit: μm).

The graph of FIG. 15 shows an example of such a positional relationship, in which example (i) a position of the optical axis on the surface S1 is an origin (0 μm in the Y direction) and (ii) a position of the optical axis on the surface S2 is 2 μm in the Y direction.

Further, FIG. 15 shows the following two patterns of a position of the optical axis on the surface S3: the position is 1 μm in the Y direction (referred to as "pattern S3(*a*)"); and the position is −2 μm in the Y direction (referred to as "pattern S3(*b*)").

Figure 16:
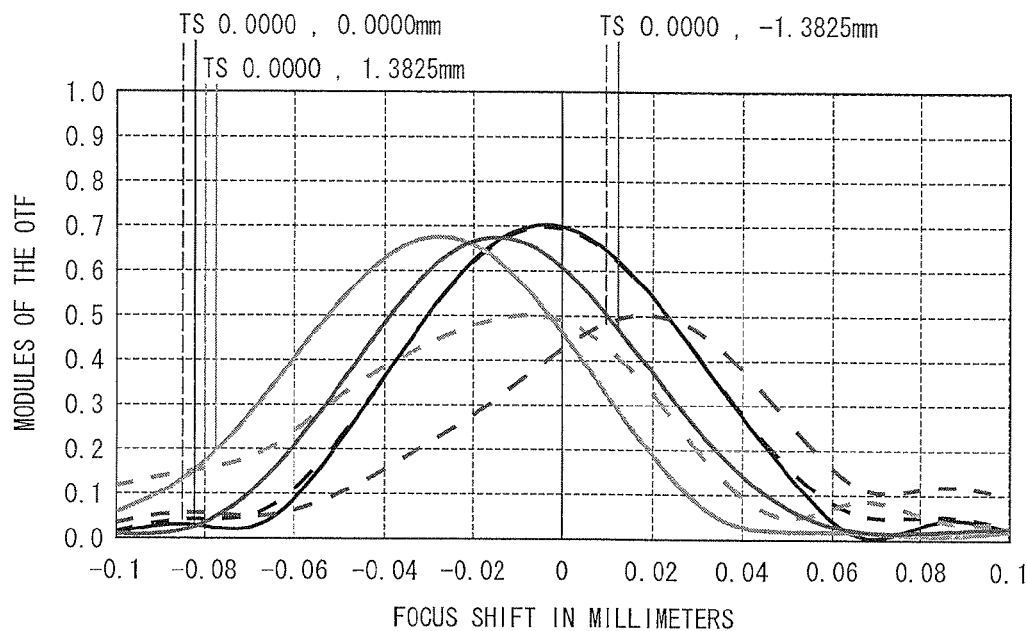
FIG. 16 is a graph showing a defocus MTF of the image capturing lens of FIG. 4 in a case where a position of the optical axis on the third surface is 1 μm in a Y direction of FIG. 15.

FIG. 16 is a graph showing a defocus MTF of the image capturing lens 140 in the pattern S3(*a*).

Figure 17:
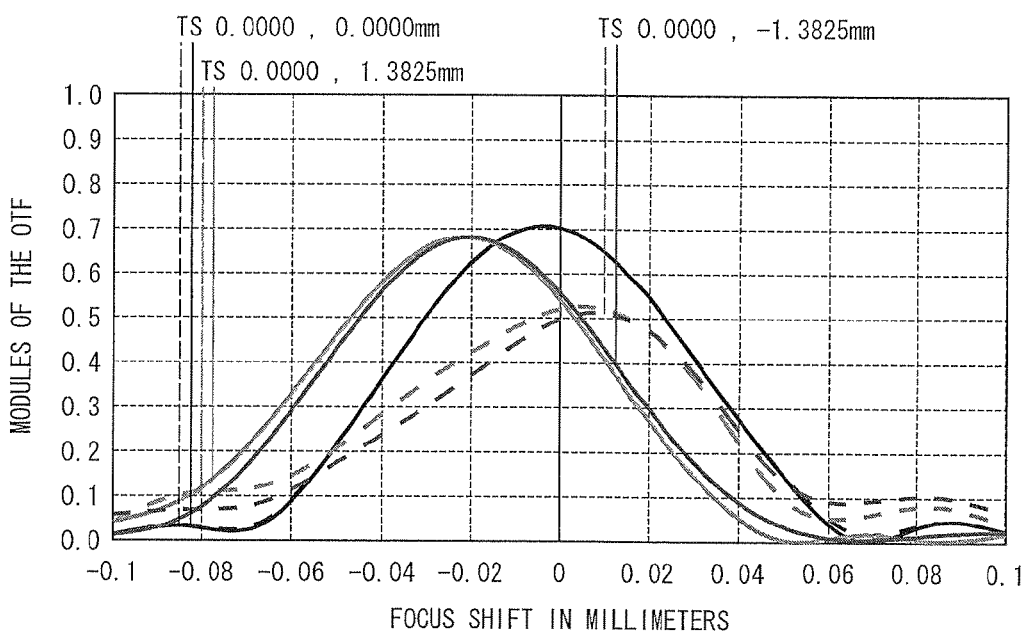
FIG. 17 is a graph showing a defocus MTF of the image capturing lens of FIG. 4 in a case where a position of the optical axis on the third surface is −2 μm in the Y direction of FIG. 15.

FIG. 17 is a graph showing a defocus MTF of the image capturing lens 140 in the pattern S3(*b*).

As is clear from a comparison between the pattern S3(*a*) and the pattern S3(*b*), the decentering amount of the whole image capturing lens 140 is smaller in the pattern S3(*a*) than in the pattern S3(*b*).

However, FIGS. 16 and 17 show that a better defocus characteristic is obtained in the pattern S3(*b*), rather than in the pattern S3(*a*).

As early described, as long as any decentering is generated between both surfaces of a lens, there exists an appropriate alignment amount between the respective lenses, which appropriate alignment amount matches the decentering thus generated.

Further, the pattern S3(*b*) matches a result calculated, on the basis of Formula (1), by the aligning position calculation control mechanism 2.

[Structure of Image Capturing Lens on which Components are Mounted (Three Lenses)]

Figure 18:
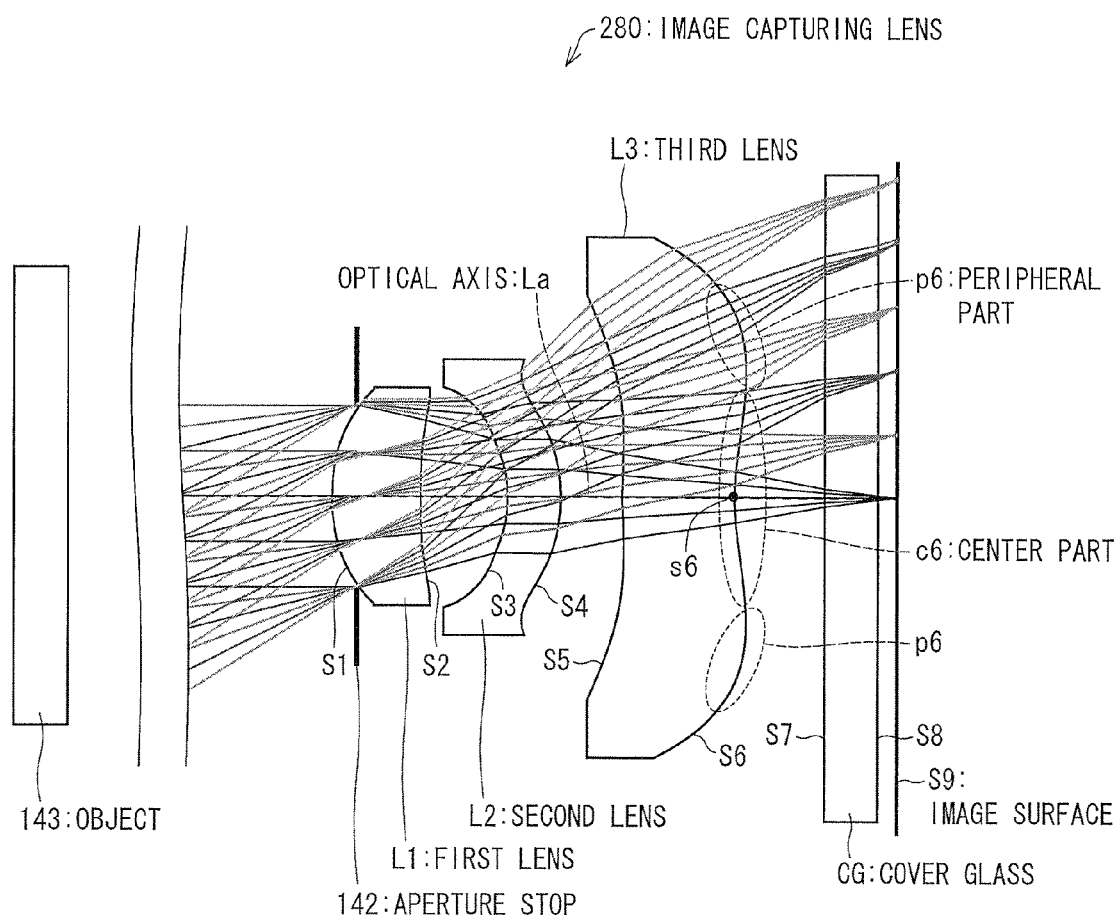
FIG. 18 is a sectional view illustrating a structure of the image capturing lens including three lenses and illustrating a state in which components are mounted on the image capturing lens of FIG. 2.

FIG. 18 is a sectional view illustrating a structure of the image capturing lens including three lenses and illustrates a state in which components are mounted on an image capturing lens 121 (see FIG. 2).

An image capturing lens of FIG. 18 is different from the image capturing lens of FIG. 4 in the following points later described Unlike the image capturing lens 140, an image capturing lens 280 includes a third lens L3 in addition to a first lens L1 and a second lens L2. Note that the third lens L3 is provided between the second lens L2 and an image surface S9 (specifically, a cover glass CG).

Specifically, the image capturing lens 280 is configured so that an aperture stop 142, the first lens L1, the second lens L2, the third lens L3, and the cover glass CG are provided, in this order, between an object 143 and an image surface S9. The image capturing lens 280 is made up of three lenses, i.e., the first lens L1, the second lens L2, and the third lens L3, like the image capturing lens 121.

Further, shapes of the first lens L1 and the second lens S2 are slightly different between the image capturing lens 140 and the image capturing lens 280. However, it can be considered that the first lens L1 and the second lens S2 of the image capturing lens 140 and those of the image capturing lens 280 have, in general, substantially the same characteristics.

That is, the first lens L1 of the image capturing lens 280 is a well-known meniscus lens which has a positive refractive power and whose surface S2, directing to the object 143 side, is a convex surface (convex shape). Further, the second lens L2 of the image capturing lens 280 has a negative refractive power and whose surface S3, directing to the object 143 side, has a concave shape.

The third lens L3 has a positive refractive power.

The third lens L3 has a surface S6, directing to the image surface S9 side. The surface S6 has (i) a center s6 and its vicinity, i.e., a center part c6 which have a concave shape and (ii) a peripheral part p6 of the center part c6 each of which has a convex shape. To put it another way, the surface S6 has a shape having inflection points at which a concave center part c6 is changed over to the convex peripheral part p6 or vice versa. Note that the inflection point intends to mean a point on a curve of a sectional shape of the lens within an effective diameter of the lens and on an aspherical surface, at which point a tangential plane at a vertex of the aspherical surface becomes a plane perpendicular to the optical axis.

According to the image capturing lens 280 having the inflection point at the surface S6, (i) an image can be formed, on a side closer to the object 143 side in the Z direction, by light rays which pass through the center part c6 and (ii) an image can be formed, on a side closer to the image surface S9 side in the Z direction, by light rays which pass through the peripheral part p6. Accordingly, the image capturing lens 280 can correct various aberrations such as curvature of field in accordance with specific shapes, i.e., the concave shape of the center part c6 and the convex shape of the peripheral part p6.

Figure 19:
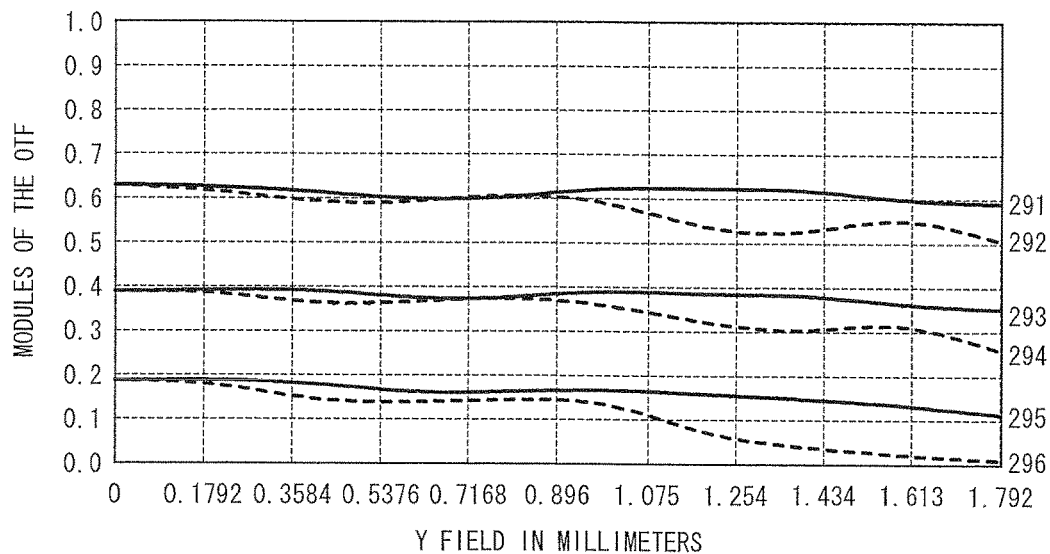
FIG. 19 is a graph showing an MTF—image height characteristic of the image capturing lens of FIG. 18.

FIG. 19 is a graph showing an MTF-image height characteristic of the image capturing lens 280.

Figure 20:
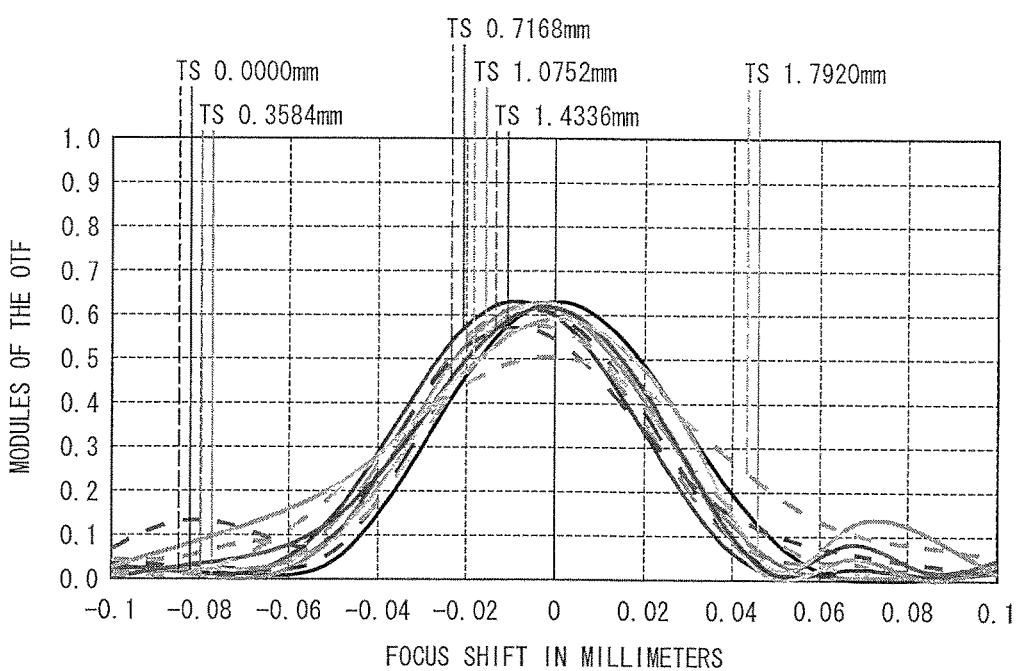
FIG. 20 is a graph showing a defocus MTF of the image capturing lens of FIG. 18.

FIG. 20 is a graph showing a defocus MTF of the image capturing lens 280.

Figure 21:
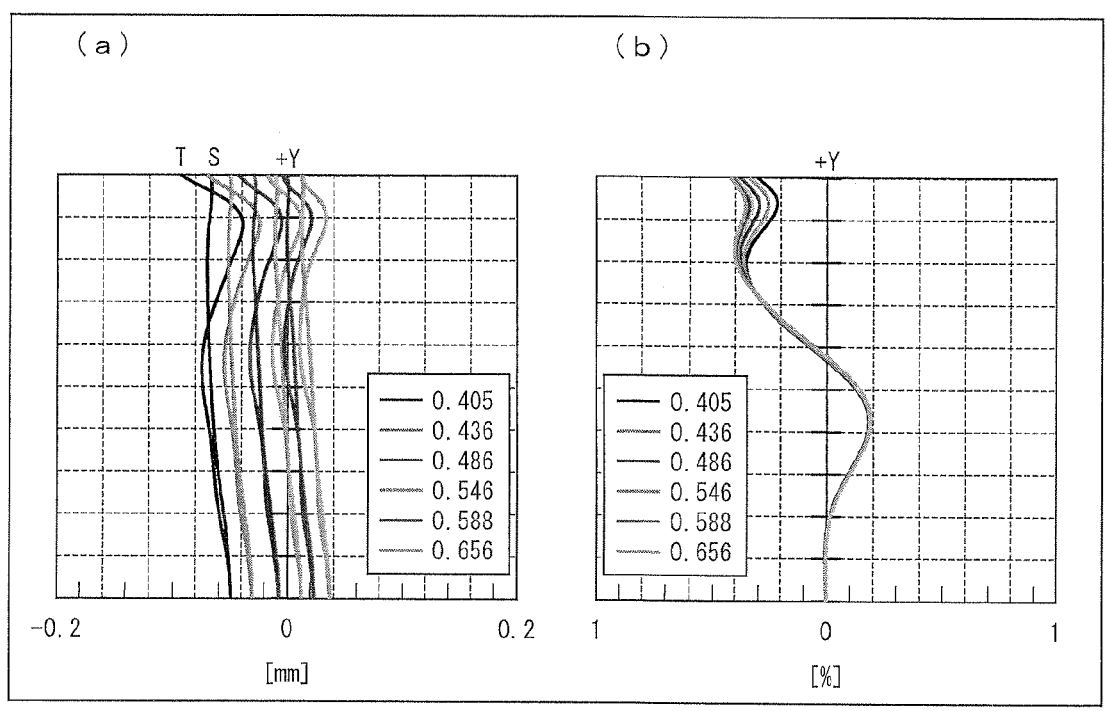
FIG. 21(a) is a graph showing an astigmatism characteristic of the image capturing lens of FIG. 18, and (b) of FIG. 21 is a graph showing a distortion characteristic of the image capturing lens of FIG. 18.

(*a*) of FIG. 21 is a graph showing an astigmatic characteristic of the image capturing lens 280, and (*b*) of FIG. 21 is a graph showing a distortion characteristic of the image capturing lens 280.

Vertical axes of the graphs of FIG. 19 and FIG. 20 show MTF (no unit).

The horizontal axis of the graph of FIG. 19 is an image height (unit: mm), and the graph shows characteristics of a tangential image surface and a sagittal image surface for the image heights of h0 (0 mm) to h1.0 (1.792 mm). Further, FIG. 19 shows a characteristic obtained when the spatial frequency is "Nyquist frequency/4 (89.3 lp/mm)", (ii) a characteristic obtained when the spatial frequency is "Nyquist frequency/2 (178.6 lp/mm)", and (iii) a characteristic obtained when the spatial frequency is "Nyquist frequency (357.1 lp/mm)".

The horizontal axis of the graph of FIG. 20 is a focus shift position (unit: mm), and the graph shows characteristics of each of the tangential (T) and sagittal (S) image surfaces for the image heights of h0, h0.2 (0.3584 mm), h0.4 (0.7168 mm), h0.6 (1.0752 mm), h0.8 (1.4336 mm), and h1.0. Further, FIG. 20 shows a characteristic obtained when the spatial frequency is "Nyquist frequency/4".

Specifically, (a) of FIG. 21 shows a relationship, in the image capturing lens 280, between the curvature of field (horizontal axis (unit: mm)) and the image height (vertical axis of the image capturing lens 280. (b) of FIG. 21 shows a relationship, in the image capturing lens 280, between the distortion (horizontal axis (unit: %)) and the image height (vertical axis). That is, the characteristics of the image capturing lens 280 shown in (a) and (b) of FIG. 21 correspond to the characteristics of the image capturing lens 140 shown in (a) and (b) of FIG. 7.

Note that, in the following description, the MTF of 0.2 or more is considered as high resolution power.

There are two ways to express an image height of the image capturing lens 280 in accordance with the present embodiment. One of them is to express an image height absolute values (0 mm to 1.792 mm) on the premise that a maximum image height is 1.792 mm. The other is to express an image height as proportions (h0 to h1.0) of the image height to a maximum image height on the premise that the maximum image height is assumed to be 1 (h1.0). An example relationship between the absolute values and the proportions will be described below.

0 mm=image height h0 (center of image)
0.1792 mm=image height h0.1
0.3584 mm=image height h0.2
0.7168 mm=image height h0.4
1.0752 mm=image height h0.6
1.4336 mm=image height h0.8
1.792 mm=image height h1.0

Further, in order to obtain the optical characteristics of the image capturing lens 280, (i) an object distance is assumed to be infinity and (ii) white light is used as a simulation light source, which white light is the same as that used to obtain the optical characteristics of the image capturing lens 140.

Graphs 291 through 296 of FIG. 19 each show the following measurement results. The graph 291 shows an MTF characteristic of the sagittal image surface, which MTF characteristic is obtained when the spatial frequency is "Nyquist frequency/4". The graph 292 shows an MTF characteristic of the tangential image surface, which MTF characteristic is obtained when the spatial frequency is "Nyquist frequency/4". The graph 293 shows an MTF characteristic is obtained when the spatial frequency is "Nyquist frequency/2". The graph 294 shows an MTF characteristic of the tangential image surface, which MTF characteristic is obtained when the spatial frequency is "Nyquist frequency/2". The graph 295 shows an MTF characteristic of the sagittal image surface, which MTF characteristic is obtained when the spatial frequency is "Nyquist frequency". The graph 296 shows an MTF characteristic of the tangential image surface, which MTF characteristic is obtained when the spatial frequency is "Nyquist frequency".

The MTF of the image capturing lens 280 exceeds 0.2 for any of the image heights of h0 to h1.0 under the conditions corresponding to the respective graphs 291 through 294. This demonstrates that, in a case where the spatial frequency is "Nyquist frequency/2" or less, the image capturing lens 280 achieves good contrast in the periphery of an image (i.e., the image height h1.0 and in the vicinity of h1.0). Meanwhile, the MTF of the image capturing lens 280 falls below 0.2 for any of the image heights of h0 to h1.0.

At the focus shift position of 0 mm, the MTF in each of the sagittal and the tangential image surfaces of the image capturing lens 280 exceeds 0.2 (i.e., has high resolution power) for any of the image heights of h0 to h1.0 (see FIG. 20). Note that the focus shift position of 0 mm corresponds to the image surface S9 (see FIG. 18).

As is clear from (a) and (b) of FIG. 21, since the image capturing lens 280 has a small amount of residual aberration (a displacement of magnitudes of aberrations in a direction along normal to the optical axis La is small), the image capturing lens 280 has a good optical characteristic.

FIG. 22 is a table showing design data of the image capturing lens 280.

Items of FIG. 22 are defined as follows.

"Structure": constituents of the image capturing lens 280. Specifically, "aperture stop" means a stop surface of the aperture stop 142, "L1" means the first lens L1, "L2" means the second lens L2, "L3" means the third lens L3, "CG" means the cover glass CG, and "sensor" means a surface (image surface S9) on which a sensor is provided. Further, "S0" means the stop surface S0 of the aperture stop 142, "S1" through "S8" mean the surfaces S1 through S8, and "S9" means the image surface S9.

"Curvature": a curvature of each of lens surfaces of the respective surfaces S1 through S6. The unit of the curvature is $mm^{-1}$.

"Thickness": a thickness of each center of the surfaces S0 through S9, i.e., a distance, in a direction of the optical axis La (Z direction), between respective centers of any adjacent two of the surfaces S0 through S9 which are arranged in this order.

"Effective radius": an effective radius of each of the surfaces S0 through S6 and an effective radius of the image surface S9. The unit of the effective radius is mm.

"Aspherical surface coefficient": an i-th order aspherical surface coefficient Ai (i is an even number of 4 or more) of an aspherical surface equation (6) expressing an aspherical surface of each of the surfaces S1 through S6.

FIG. 23 is a table showing an example design specification of the image capturing module including the image capturing lens 280. Note that the image capturing module is not shown.

Items of FIG. 23 are defined as follows.

"Lens": an structure of the image capturing lens 280.

"Construction": the number of lenses of which the image capturing lens 280 is made up. "3P" means that the image capturing lens 280 is made up of three lenses.

"Nd": a refractive index which each of the lenses (L1 through L3), constituting the image capturing lens 280, has when the d line passes each of the lenses.

"γD": an Abbe number which each of the lenses (L1 through L3), constituting the image capturing lens 280, has when the d line passes each of the lenses.

"Sensor": a sensor for use in the image capturing module.

"Pixel size": a pixel pitch of the sensor. The unit of the pixel size is μm.

"Resolution": the number of pixels in the sensor, expressed through the number of pixels in a horizontal (H) direction and the number of pixels in a vertical (V) direction. The unit of the resolution is pixel.

"Size": a size of the sensor specified by three kinds of values (three dimensional values), i.e., diagonal (D), horizontal (H), and vertical (V) values. The unit of the size is mm.

"F number": F number of the image capturing lens 280.

"Focal length": a focal length of an entire system of the image capturing lens 280. The unit of the focal length is mm.

"Field of view": an angle of view of the image capturing lens 280 which is specified by three kinds of value (three dimensional values), i.e., diagonal, horizontal, and vertical values. The unit of the field of view is deg(°).

"Optical distortion": distortion of the image capturing lens 280 at three points (image heights of h0.6, h0.8, and h1.0). The unit of the optical distortion is %.

"TV distortion": TV distortion of the image capturing lens 280. The unit of the TV distortion is %.

"Relative illumination": an ambient light amount ratio of the image capturing lens 280 at the three points (image height h0.6, h0.8, and h1.0). The unit of the relative illumination is %.

"CRA": an angle of a main optical beam at the three points (image heights of h0.6, h0.8, and h1.0). The unit of the CRA is deg.

"Optical length": a total optical length of the image capturing lens 280. The unit of the optical length is mm.

"CG thickness": a thickness, in a direction in which the optical axis La extends, of the cover glass CG provided in the image capturing lens 280. The unit of the CG thickness is mm.

"Hyper focal distance": a hyper focal distance of the image capturing lens 280. The unit of the hyper focal distance is mm.

[Verification of Alignment by Image Capturing Lens on which Component is Mounted (Three Lenses)]

An alignment is verified with use of the image capturing lens 280 of FIG. 18.

When verifying the alignment, the image height h 0 (center image height, first position), the image height h0.8 (second position), the image height of h−0.8 (third position) are analyzed. That is, a distance between the image height h0 to the image height h0.8 is a "predetermined distance y" in accordance with the present invention.

An idea of a difference between the image height hL and the image height h(−L) and an idea of a difference between the "predetermined distance y" and the "predetermined distance −y" are identical to the ideas described in Item [Verification of alignment by image capturing lens on which component is mounted (two lenses)], except that an image capturing lens to be verified is not the image capturing lens 140 but the image capturing lens 280.

Figure 24:
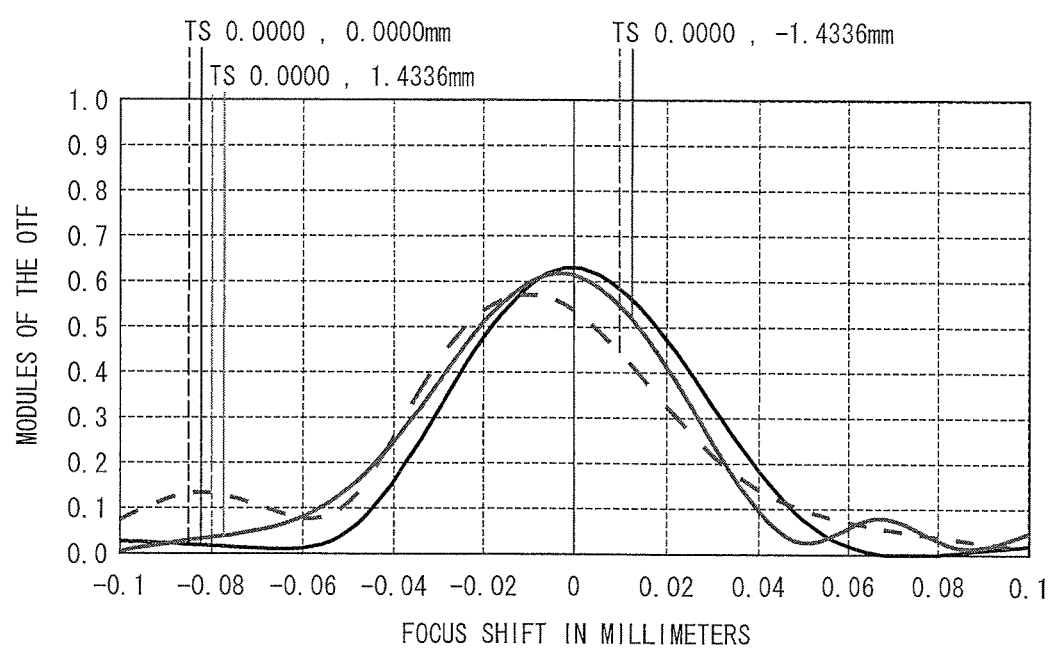
FIG. 24 is a graph showing a defocus MTF of the image capturing lens of FIG. 18 in a case where a spatial frequency is 89.3 lp/mm.

Also note that a defocus characteristic (defocus MTF) was analyzed in the verification under the condition of a spatial frequency of 89.3 lp/mm (Nyquist frequency/4). Refer to FIG. 24 as to the detailed defocus characteristic.

Further, in order to carry out the aforementioned Verification, white light is used as a simulation light source, which white light is the same as that used to obtain the optical characteristics of the image capturing lens 140.

FIG. 25 is a table partially showing how the aligning position calculation control mechanism 12 calculates decentering amount on the basis of a simulation result of a displacement amount of an image surface position in the Z direction, which displacement amount is generated by decentering of the image capturing lens 280.

"Design value": data obtained in a case where the image capturing lens 280 does not generate any decentering.

"Axial displacement s2 to s1 (L1)": data relating to a first lens decentering amount.

"Axial displacement s4 to s3 (L2)": data relating to a second lens decentering amount.

"Axial displacement s3 to s2 (L1-L2)": data relating to a first target inter-lens decentering amount.

"Axial displacement s6 to s5 (L3)": data relating to a third decentering amount.

"Axial displacement s5 to s4 (L2-L3)": data relating to a second target inter-lens decentering amount.

"Axial displacement": expected values of a decentering amount of each item shown in Item "State". The unit of the axial displacement is μm, and the axial displacement can be indicated by character "a". A plurality of expected values are set to each item of Item "State".

"Displacement of image surface position with respect to h0": a first-second displacement amount, which is a displacement amount in the Z direction, of the image surface position at the image height h0 with respect to the image surface position at the image height h0. The first-second displacement amount is for each of (ii) sagittal image surface and tangential image surface and (ii) items of Item "Axial displacement". Further, the "Displacement of image surface position" also shows a first-third displacement amount, which is an amount in the Z direction, of the image surface position at the image height h(−0.8) with respect to the image surface position at the image height h0. The first-third displacement amount is for each of (i) the sagittal image surface and the tangential image surface, and (ii) items of Item "Axial displacement". The unit of the "Displacement of image surface position" is μm.

Specifically,

"+y tan.": the first-second displacement amount of the tangential image surface, which is indicated by character "b".

"+y sag.": the first-second displacement amount of the sagittal image surface, which is indicated by character "c".

"−y tan.": the first-third displacement amount of the tangential image surface, which is indicated by character "d".

"+y sag." shows the first-third displacement amount of the sagittal image surface, which is indicated by character "e".

"Difference between image surface positions": a difference between the first-second displacement amount and the first-third displacement amount, for each of (i) the sagittal image surface and the tangential image surface, and (ii) the items of Item "Axial amount". A difference of the tangential image surface can be expressed as "b−d" by using characters "b" and "d". A difference of the sagittal image surface can be expressed as "c−e" by using characters "c" and "e". The unit of the difference between the image surface positions is μm.

"Difference between image surface positions per unit axial displacement": (A) a displacement amount of an image surface position with respect to 1 μm (expected value) of a decentering amount for each of (i) the sagittal image surface and the tangential image surface and (ii) the items of Item "Axial displacement" and (B) an average value of the displacement amounts.

Specifically, the following description relates to Item "Difference between image surface positions per unit axial displacement", "Sag." and "tan.": the displacement amount of the image surface position with respect to 1 μm (expected value) of the decentering amount for each of (i) the sagittal image surface and the tangential image surface and (ii) the items of Item "Axial displacement". The displacement amount in the tangential image surface can be expressed as "(b−d)/a" by using character "a", and the displacement amount in the sagittal image surface can be expressed as "(c−e)/a" by using character "a".

"Average value (=α)": the displacement amount of the image surface position with respect to 1 μm (expected value) of the decentering amount for each of (i) the sagittal image surface and tangential image surface and (ii) the items of Item "State". Note that the average value intends to mean an average value of a plurality of displacement amounts which correspond to the plurality of expected values of each item of Item "State".

The following description will discuss how the aligning position calculation control mechanism 12 calculates the first lens decentering amount of the image capturing lens 280 on the basis of a simulation result of FIG. 25. Note that how the aligning position calculation control mechanism 12 calculates each of the second lens decentering amount, the first target inter-lens decentering amount, the third lens decentering amount, and the second target inter-lens decentering amount of the image capturing lens 280 is similar to how the first lens decentering amount is calculated (later described). As such, description thereof is omitted.

For convenience, hereinafter, the sagittal image surface of the image capturing lens 280 is merely referred to as "sagittal image surface", and the tangential image surface of the image capturing lens 280 is merely referred to as "tangential image surface".

First, a plurality of expected values of the decentering amount are set as the first lens decentering amount of the image capturing lens 280. In FIG. 25, as shown in Item "Axial displacement", three values (1 µm, 2 µm, and 3 µm) were set as the expected values.

Next, the first-second displacement amount (the displacement amount, which is a displacement amount in the Z direction, of the image surface position at the image height of h0.8 with respect to the image surface position at the image height of h0) and the first-third displacement amount (the displacement amount, which is a displacement amount in the Z direction, of the image surface position at the image height of h(−0.8) with respect to the image surface position at the image height of h0) are calculated with respect to the set expected value of 1 µm. The first-second displacement amount and the first-third displacement amount are calculated for each of the sagittal and tangential image surfaces.

Also in a case of 2 µm (the expected value that has been set), the first-second displacement amount and the first-third displacement amount are calculated for each of the sagittal and tangential image surfaces. Similarly, in a case of 3 µm (the expected value that has been set), the first-second displacement amount and the first-third displacement amount are calculated for each of the sagittal and tangential image surfaces.

Here, as early described, the first-second displacement amount of the tangential image surface is expressed as character "b", the first-second displacement amount of the sagittal image surface is expressed as character "c", the first-third displacement amount of the tangential image surface is expressed as character "d", and the first-third displacement amount of the sagittal image surface is expressed as character "e".

The following values were obtained in the case of 1 µm (the expected value that has been set).
b: −18.3 µm
c: −7.1 µm
d: −1.3 µm
e: 0.9 µm Further, the following values were obtained in the case of 2 µm (the expected value that has been set).
b: −26.8 µm
c: −10.7 µm
d: 6.9 µm
e: 4.2 µm Further, the following values were obtained in the case of 3 µm (the expected value that has been set).
b: −34.4 µm
c: −14.5 µm
d: 14.7 µm
e: 8.0 µm Then, the difference between the first-second displacement amount and the first-third displacement amount is calculated for each of the sagittal and tangential image surfaces.

Also in a case of 2 µm and 3 µm (the expected values that has been set), the difference between the first-second displacement amount and the first-third displacement amount is calculated for each of the sagittal and tangential image surfaces.

The following values were obtained in the case of 1 µm (the expected value that has been set).
b-d: −17.0 µm
c-e: −8.0 µm Further, the following values were obtained in the case of 2 µm (the expected value that has been set).[0349]
b-d: −33.7 µm
c-e: −14.9 µm Further, the following values were obtained in the case of 3 µm (the expected value that has been set).
b-d: −49.1 µm
c-e: −22.5 µm Next, a displacement amount of the image surface position with respect to the expected value of the decentering amount, i.e., 1 µm is calculated for each of 1 µm, 2 µm, and 3 µm (the expected values that have been set). Specifically, the displacement amount of the image surface position is calculated by dividing the difference between the first-second displacement amount and the first-third displacement amount by a corresponding expected value of the decentering amount.

Here, the expected values of the decentering amount are indicated by the foregoing character "a."

Then, the following values were obtained in the case of the expected value that has been set, i.e., 1 µm (a=1 µm).
(b−d)/a: −17.0
(c−e)/a: −8.0

Further, the following values were obtained in the case of the expected value that has been set, i.e., 2 µm (a=2 µm).
(b−d)/a: −16.9
(c−e)/a: −7.4

Further, the following values were obtained in the case of the expected value that has been set, i.e., 3 µm (a=3 µm).
(b−d)/a: −16.4
(c−e)/a: −7.5

Next, an average value (i.e., quotients of the division) of the displacement amounts of the image surface position (which have been calculated for the expected values that have been set, i.e., 1 µm, 2 µm, and 3 µm) with respect to the expected value of the decentering amount, i.e., 1 µm are calculated for the sagittal image surface, and the same applies to the tangential image surface.

The following values were obtained.
The aforementioned average value for the tangential image surface: (−17.0−16.9−16.4)÷3=−16.75
The aforementioned average value for the sagittal image surface: (−8.0−7.4−7.5)÷3=−7.63
The aforementioned average value for the tangential image surface is represented as $\alpha_{tan.2}$, the aforementioned average value for the sagittal image surface is represented as $\alpha_{sag.2}$.

Further, the second lens decentering amount, the first target inter-lens decentering amount, and the third lens decentering amount of the image capturing lens 280 are calculated in a manner similar to the first lens decentering amount.

Figure 26:
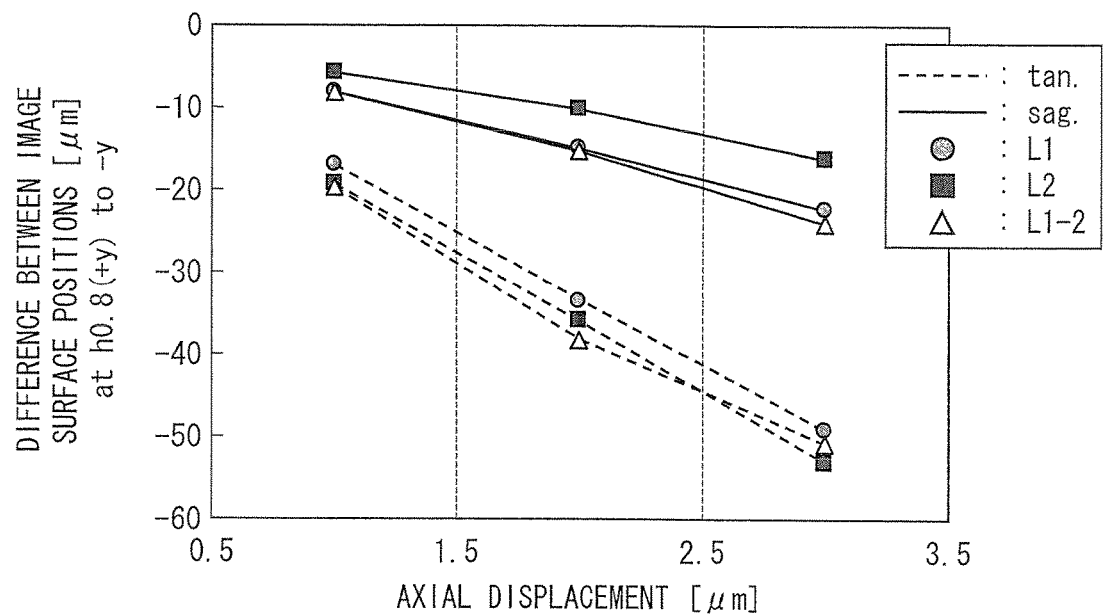
FIG. 26 is a graph showing a relationship between Item "Difference between image surface positions" and Item "Axial displacement" according to a simulation of FIG. 25.
Figure 27:
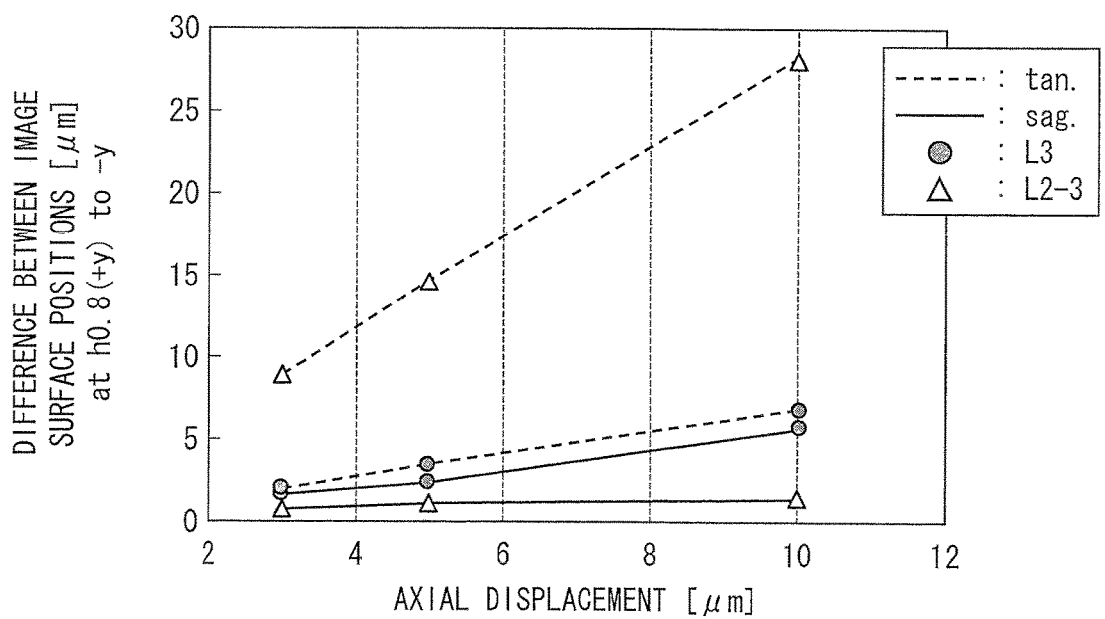
FIG. 27 is a graph showing a relationship between Item "Difference between image surface positions" and item "Axial displacement" according to a simulation of FIG. 25.

$\alpha_{tan.4}$: the aforementioned average value in the tangential image surface, which average value corresponds to the second lens decentering amount $\alpha_{sag0.4}$: the aforementioned average value of the sagittal image surface, which average value corresponds to the second lens decentering amount $\alpha_{tan.3}$: the aforementioned average value of the tangential image surface, which average value corresponds to the first target inter-lens decentering amount $\alpha_{sag.3}$: the aforementioned average value of the sagittal image surface, which average value corresponds to the first target inter-lens decentering amount $\alpha_{tan.5}$: the aforementioned average value of the tangential image surface, which average value corresponds to the second target inter-lens decentering amount FIGS. 26 and 27 are graphs each showing a relationship, obtained from a simulation of FIG. 25, between Item "Difference between image surface positions" (the vertical axis) and Item "Axial displacement" (the horizontal axis).

FIG. 26 shows the aforementioned relationships of the sagittal image surface and those in the tangential image surface, which relationships relate to the first lens decentering amount (L1 of FIG. 26), the second lens decentering amount (L2 of FIG. 26), and the first target inter-lens decentering amount (L1-L2 of FIG. 26).

FIG. 27 shows the aforementioned relationships of the sagittal image surface and those in the tangential image surface, which relationships relate to the third lens decentering amount (L3 of FIG. 27) and the second target inter-lens decentering amount (L2-L3 of FIG. 27).

Figures 28, 29, 30:
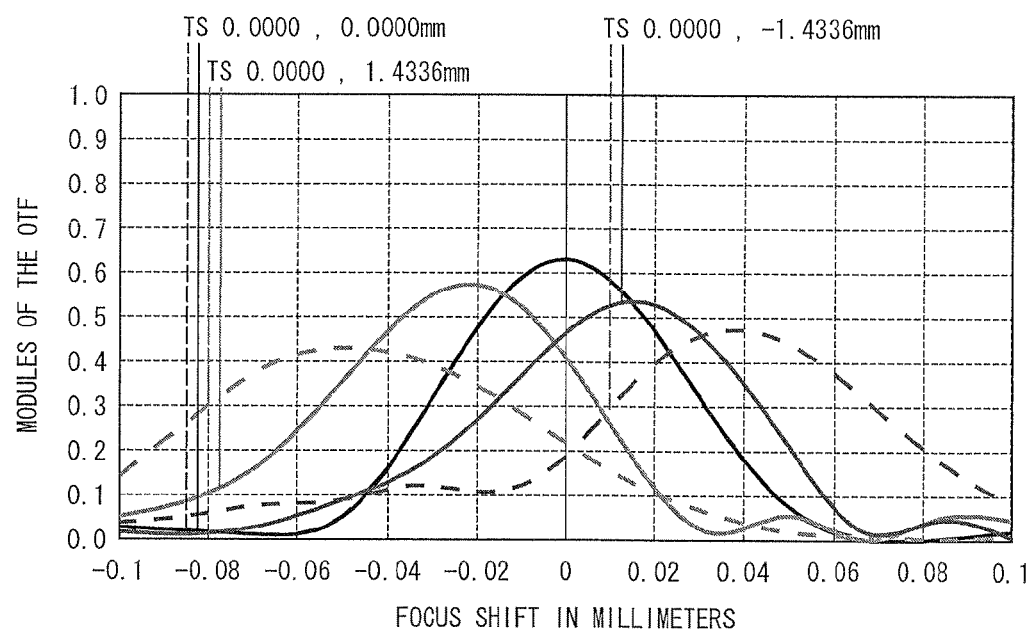
FIG. 28 is a table showing numerical values of $\alpha_{sag.2}$, $\alpha_{sag.3}$, $\alpha_{sag.4}$, $\alpha_{tan.2}$, $\alpha_{tan.3}$, $\alpha_{tan.4}$, and $\alpha_{tan.5}$, which numerical values are determined from the simulation of FIG. 25.
FIG. 29 is a table showing results where the numerical values of FIG. 28 are substituted for Formulae (2) and (3).
FIG. 30 is a graph showing a defocus MTF of the image capturing lens of FIG. 18 in a state in which the first lens decentering amount and the second lens decentering amount of FIG. 29 exist and these decentering amounts are adjusted by a first target inter-lens decentering amount and a second target inter-lens decentering amount of FIG. 29.

FIG. 28 is a table showing numerical values of $\alpha_{sag.2}$, $\alpha_{sag.3}$, $\alpha_{sag.4}$, $\alpha_{tan.2}$, $\alpha_{tan.3}$, $\alpha_{tan.4}$, and $\alpha_{tan.5}$ which are determined by the simulation of FIG. 25.

Further, FIG. 29 is a table showing a result obtained by substituting each of the numerical values of FIG. 28 for Formulae (2) and (3). FIG. 29 shows a first target inter-lens decentering amount (L1-L2 of FIG. 29) and a second target inter-lens decentering amount (L2-L3 of FIG. 29), which were obtained by the substitution. FIG. 29 is an example where the first lens decentering amount (L1 of FIG. 29) and the second lens decentering amount (L2 of FIG. 29) are both 3 μm.

In FIG. 29, "decenter" shows decentering amounts which are already generated, and "adjust dec." shows the decentering amounts. In FIG. 29, "factor" shows the kinds of decentering amounts and "dec." shows numerical values of the decentering amounts.

FIG. 30 is a graph showing a defocus MTF of the image capturing lens 280 obtained in a state in which the first lens decentering amount and the second lens decentering amount of FIG. 29 exist but are not adjusted by the first target inter-lens decentering amount and the second target inter-lens decentering amount of FIG. 29.

In a case where the first lens decentering amount and the second lens decentering amount exist but are not adjusted, a position of the image surface S9 of the image capturing lens 280 varies widely. This does not allow a satisfactory defocus characteristic shown in FIG. 30 to be obtained.

Figure 31:
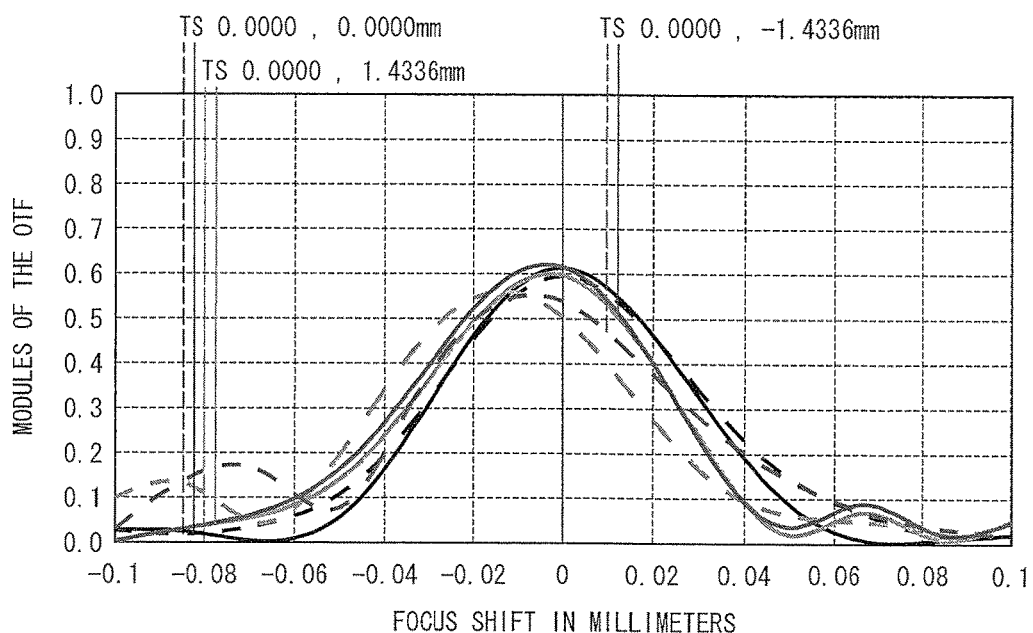
FIG. 31 is a graph showing a defocus MTF of the image capturing lens of FIG. 18 in a state in which a first lens decentering amount and a second lens decentering amount of FIG. 29 exist and lens decentering amount is adjusted by a first target inter-lens decentering amount of FIG. 29

FIG. 31 is a graph of a defocus MTF of the image capturing lens 280 obtained in a state in which the first lens decentering amount and the second lens decentering amount of FIG. 29 exist and are adjusted by the first target inter-lens decentering amount of FIG. 29.

Figure 32:
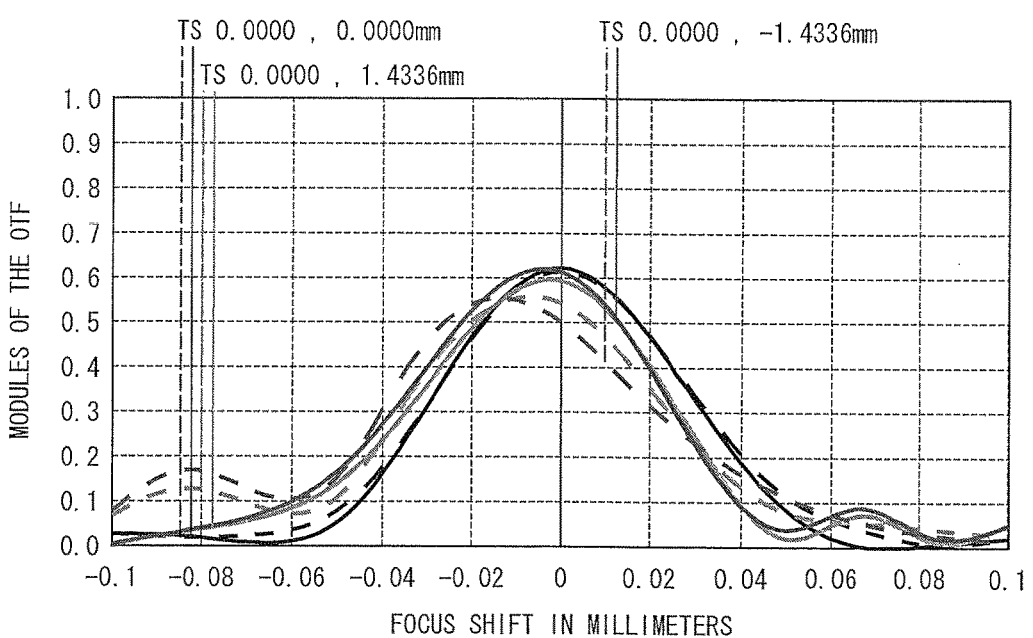
FIG. 32 is a graph showing a defocus MTF of the image capturing lens of FIG. 18 in a state in which the first lens decentering amount and the second lens decentering amount of FIG. 29 exist and lens decentering amount is not adjusted by a first target inter-lens decentering amount and a second target inter-lens decentering amount of FIG. 29.

FIG. 32 is a graph of a defocus MTF of the image capturing lens 280 obtained in a state in which the first lens decentering amount and the second lens decentering amount of FIG. 29 exist and are adjusted by the second target inter-lens decentering amount of FIG. 29.

As is clear from FIG. 31, (i) such a variation of the sagittal image surface of the image capturing lens 280 and (ii) a of the tangential image surface of the image capturing lens 280 were corrected by the alignment with use of the target first target inter-lens decentering amount of FIG. 29.

As is clear from FIG. 32, such a variation of the tangential image surface of the image capturing lens 280 was corrected by the alignment with use of the second target inter-lens decentering amount of FIG. 29.

Note that (i) numerical values of the tangential image surface of and (ii) numerical values of the sagittal image surface of algorithm of the present invention can be replaced with each other in some cases.

Furthermore, the alignment structure of the present invention can be used to carry out only the alignment with use of the first target inter-lens decentering amount in some cases.

Figure 33:
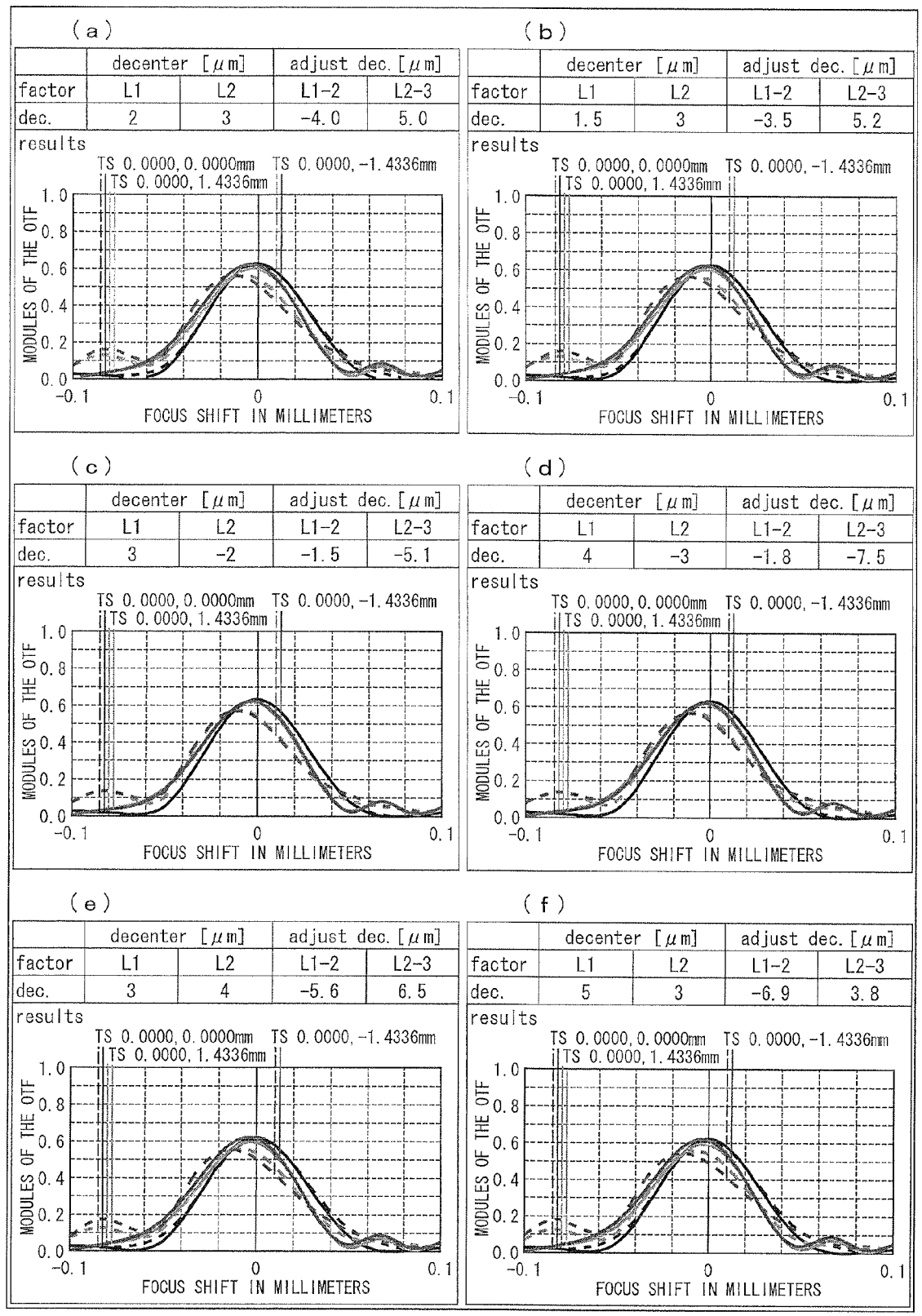
FIG. 33(a) through (f) are tables and graphs showing results of respective simulations in each of which an alignment is carried out by an aligning position calculation control mechanism with respect to several different patterns of a first lens decentering amount and a second lens decentering amount.

Finally, (a) through (f) of FIG. 33 show results of respective simulations in each of which an alignment is carried out by the aligning position calculation control mechanism 12 with respect to several different patterns of the first lens decentering amount and the second lens decentering amount.

Note that numerical values in (a) through (f) of FIG. 33 are defined in the same way as the table of FIG. 29.

Note that the decentering amounts of the first lens L1 and the second lens L2 of the image capturing lens which is made up of three or more lenses can be adjusted by the lens aligning device 110 in the same way as the image capturing lens including two lenses. In this case, it is unnecessary to adjust strictly a decentering amount(s) of a lens(es) provided between the image surface of the image capturing lens and the second lens L2.

The decentering amounts of the first lens L1, the second lens L2, and the third lens L3 of the image capturing lens which is made up of four or more lenses can be adjusted by the lens aligning device 120 in the same way as the image capturing lens which is made up of two lenses. In this case, it is unnecessary to adjust strictly a decentering amount(s) of a lens(es) positioned between the image surface of the image capturing lens and the L3.

It is construable that Formula (2) and Formula (4) have a relationship in which (i) the average value of the sagittal image surface is replaced with that of the tangential image surface and (ii) the average value of the tangential image surface is replaced with that of the sagittal image surface. The same applies to a relationship between Formula (3) and Formula (5).

The following description will discuss a concept based on which an alignment of the image capturing lens 121 is carried out.

The alignment is carried out on the basis of a displacement amount of an image surface position caused by (i) decentering generated between surfaces of one (1) lens and (ii) decentering generated between lenses. In this case, the alignment is carried out so that the decentering generated between the lenses offsets the decentering generated between the surfaces of the one (1) lens.

For example, an alignment for the sagittal image surface is carried out on the basis of the decentering generated between the first lens L1 and the second lens L2, whereas an alignment for the tangential image surface is carried out on the basis of the decentering generated between the second lens L2 and the third lens L3. Alternatively, an alignment for the tangential image surface can be carried out on the basis of the decentering generated between the first lens L1 and the second lens L2, whereas an alignment for the sagittal image surface can be carried out on the basis of the decentering generated between the second lens L2 and the third lens L3.

One of (i) Formulae (2) and (3) and (ii) Formulae (4) and (5), is used to carry out the alignment, each of the Formulae (i) and the Formulae (ii) being calculated from Formulae (7) and (8). Note that "$\alpha_x$" indicates $\alpha_{sag\_x}$ or $\alpha_{tan\_x}$ (x=any of 2 through 5).

[Formula 11]

$$\overrightarrow{dec.S_3} \times \alpha_3 = -(\overrightarrow{dec.S_2} \times \alpha_2 + \overrightarrow{dec.S_4} \times \alpha_4) \quad (7)$$

[Formula 12]

$$\overrightarrow{dec.S_5} \times \alpha_5 = -(\overrightarrow{dec.S_2} \times \alpha_2 + \overrightarrow{dec.S_4} \times \alpha_1 + \overrightarrow{dec.S_3} \times \alpha_3) \quad (8)$$

Further, in the lens aligning device of the present invention, it is preferable that the target value calculation section calculates the second target inter-lens decentering amount after the first lens and the second lens are combined with each other.

The aforementioned arrangement makes it possible to carry out a highly accurate alignment even if the alignment of the image capturing lens including three lenses is carried out.

Further, according to the aforementioned arrangement, the convergence condition of the alignment can be defined clearly. This can improve versatility of the aligning device.

Further, in the lens aligning device of the present invention, it is preferable that the image capturing lens includes (i) a first lens array in which a plurality of first lenses are provided in a wafer and (ii) a second lens array in which a plurality of second lenses are provided in a wafer; and a combination of (a) one of the plurality of first lenses in the first lens array and (b) a corresponding one of the plurality of second lenses in the second lens array is used as the image capturing lens.

Further, in the lens aligning device of the present invention, it is preferable that the image capturing lens includes (i) a first lens array in which a plurality of first lenses are provided in a wafer, (ii) a second lens array in which a plurality of second lenses are provided in a wafer; and third lens array in which a plurality of third lenses are provided a wafer; a combination of (a) each of the plurality of first lenses in the first lens array, (b) a corresponding one of the plurality of second lenses in the second lens array, and (c) a corresponding one of the plurality of third lenses in the third array is used as the image capturing lens.

According to the aforementioned arrangement, in a wafer-level lens process, the lens aligning device which has a simple structure can be used. Consequently, the alignment of a large number of wafer-level lenses can be carried out collectively, so that the aforementioned arrangement is further effective in improvement in productivity of the image capturing lens.

Further, in the lens aligning device of the present invention, it is preferable that the decentering measurement section is structured with use of a CNC (Computerized Numerical Control) image measurement system.

According to the aforementioned arrangement, the highly accurate lens aligning device can be realized easily. An amount of parallel decentering can be detected as a whole decentering amount, in particular, in a case where at least one of the first lens to the third lens has a structure in which a part (edge surface), that is the outside of an optically effective area and is molded integrally with the wafer, in contact with a lens which is arranged to face the at least one of the first lens to the third lens, and (ii) an amount of inclination decentering between both surfaces of the at least one of the first lens to the third lens is small. This makes it possible to realize easily the lens aligning device and realize algorithm for carrying out the alignment.

Further, in the lens aligning device of the present invention, it is preferable that the decentering measurement section is structured with use of a CNC (Computerized Numerical Control) image measurement system.

The aforementioned arrangement can realize the high-accuracy lens aligning device easily.

Further, in the lens aligning device of the present invention, it is preferable that (i) the first lens is a meniscus lens which has a positive refractive power and the first surface which is a convex surface, and (ii) the second lens has a negative refractive power.

The present invention is not limited to the description of the embodiments above, and can be modified in numerous ways by a skilled person as long as such modification falls within the scope of the claims. An embodiment based on a proper combination of technical means disclosed in different embodiments is encompassed in the technical scope of the present invention.

INDUSTRIAL APPLICABILITY

The present invention can be for use in a lens aligning device for adjusting decentering of an image capturing lens which is made up of a plurality of lenses by aligning the decentering. Furthermore, the present invention can be for use in an image capturing lens which has been subjected to an alignment by the lens aligning device.

REFERENCE SIGNS LIST 1, 11 decentering detection mechanism (decentering measurement section)
2, 12 aligning position calculation control mechanism (target value calculation section)
3, 13 adjustment mechanism (lens moving section)
110, 120 lens aligning device
111, 121 image capturing lens
112a first lens array
112b second lens array
112c third lens array
140, 280 image capturing lens
142 aperture stop
143 object
CG cover glass
L1 first lens
L2 second lens
L3 third lens
La optical axis
S1 surface on object side of first lens (first surface)
S2 surface on image surface side of first lens (second surface)
S3 surface on object side of second lens (third surface)
S4 surface on image surface side of second lens (fourth surface)
S5 surface on object side of third lens (fifth surface)
S6 surface on image surface side of third lens (sixth surface)

S9 image surface
c6 center part
p6 peripheral part

The invention claimed is:

1. A lens aligning device for adjusting a decentering amount of an image capturing lens comprising at least a first lens and a second lens, the first lens and the second lens being arranged, adjacent to each other in this order, between an object and an image surface, said lens aligning device adjusting the image capturing lens by moving at least one of the first lens and the second lens, said lens aligning device comprising:

a CNC (Computerized Numerical Control) image measurement system or a mechanism configured to carry out a reflective decentering measurement for measuring a first lens decentering amount which is a decentering amount of a first lens image side surface of the first lens with respect to a first lens object side surface of the first lens, the first lens object side surface being located on an object side, the first lens image side surface being located on an image surface side;

a CPU ( central process unit) or a hardware logic configured to calculate a target inter-lens decentering amount which is twice as much as the first lens decentering amount and by which a second lens object side surface of the second lens located on the object is shifted (i) with respect to the first lens image side surface and (ii) in a direction opposite a direction in which the first lens image side surface is decentered with respect to the first lens object side surface; and a manipulator mechanism configured to move at least one of the first lens and the second lens so that an inter-lens decentering amount which is a decentering amount of the second lens object side surface with respect to the first lens image side surface matches the target inter-lens decentering amount.

2. The lens aligning device as set forth in claim 1, wherein:

the image capturing lens includes (i) a first lens array in which the first lens is provided in a wafer and (ii) a second lens array in which the second lens is provided in a wafer; and a combination of the first lens in the first lens array and the second lens in the second lens array is used as the image capturing lens.

3. An image capturing lens comprising at least a first lens and a second lens, the first lens and the second lens being arranged, adjacent to each other in this order, between an object and an image surface, a decentering amount of the image capturing lens being adjusted by a lens aligning device, said lens aligning device adjusting the image capturing lens by moving at least one of the first lens and the second lens, said lens aligning device comprising:

a CNC (Computerized Numerical Control) image measurement system or a mechanism for carrying out reflective decentering measurement configured to measure a first lens decentering amount which is a decentering amount of a first lens image side surface of the first lens with respect to a first lens object side surface of the first lens, the first lens object side surface being located on an object side, the first lens image side surface being located on an image surface side;

a CPU (central processing unit) or a hardware logic configured to calculate a target inter-lens decentering amount which is twice as much as the first lens decentering amount and by which a second lens object side surface of the second lens located on the object side is shifted (i) with respect to the first lens image side surface and (ii) in a direction opposite a direction in which the first lens image side surface is decentered with respect to the first lens object side surface; and a manipulator mechanism configured to move at least one of the first lens and the second lens so that an inter-lens decentering amount which is a decentering amount of the second lens object side surface with respect to the first lens image side surface matches the target inter-lens decentering amount.

4. The image capturing lens as set forth in claim 3, wherein:

the first lens is a meniscus lens which has a positive refractive power and a first lens object side surface which is a convex surface; and the second lens has a negative refractive power.

* * * * *